US011657130B2

(12) United States Patent
Inada et al.

(10) Patent No.: US 11,657,130 B2
(45) Date of Patent: May 23, 2023

(54) LIGHT EMITTER, LIGHT EMITTING DEVICE, OPTICAL DEVICE, AND INFORMATION PROCESSING APPARATUS

(71) Applicant: FUJIFILM BUSINESS INNOVATION CORP., Tokyo (JP)

(72) Inventors: Satoshi Inada, Kanagawa (JP); Kenichi Ono, Kanagawa (JP); Takeshi Minamiru, Kanagawa (JP); Michiaki Murata, Kanagawa (JP); Takafumi Higuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 981 days.

(21) Appl. No.: 16/511,095

(22) Filed: Jul. 15, 2019

(65) Prior Publication Data

US 2020/0271760 A1 Aug. 27, 2020

(30) Foreign Application Priority Data

Feb. 27, 2019 (JP) ............................ JP2019-034456

(51) Int. Cl.

*G01S 7/481* (2006.01)
*G01S 17/89* (2020.01)
*G06F 21/45* (2013.01)
*G01B 11/24* (2006.01)
*G01S 17/04* (2020.01)
*H01S 5/183* (2006.01)

(52) U.S. Cl.

CPC ............ *G01S 7/4815* (2013.01); *G01B 11/24* (2013.01); *G01S 17/04* (2020.01); *G01S 17/89* (2013.01); *G06F 21/45* (2013.01); *H01S 5/183* (2013.01)

(58) Field of Classification Search

CPC ........ G01S 7/4815; G01S 17/04; G01S 17/89; G06F 21/45; H01S 5/183; G01B 11/24

See application file for complete search history.

(56) References Cited

U.S. PATENT DOCUMENTS 10,463,255 B1 * 11/2019 Wilder .................. G01J 3/0208

FOREIGN PATENT DOCUMENTS

JP 2018-032654 A 3/2018

* cited by examiner

*Primary Examiner* — Kevin K Pyo
*Assistant Examiner* — Don J Williams
(74) *Attorney, Agent, or Firm* — Oliff PLC

(57) ABSTRACT

A light emitter includes: a substrate; a driving section provided on the substrate; a light source that is provided on the substrate and is driven by the driving section; a cover section through which light emitted from the light source is transmitted and that is disposed in an optical axial direction of the light source; and a support section that is provided on a part of the substrate excluding a part between the driving section and the light source and supports the cover section.

19 Claims, 14 Drawing Sheets

4C 3 60C 40 20 30 61 $t_1$ 68 $t_2$ 50 5 10 z y x

3D SENSOR
DRIVING SECTION
LIGHT SOURCE
PD
VIIB
3
10
5
6
7
70A
70B
50
33
60
20
62
63
40
30
$W_x$
$W_y$
61
4
x
y
z 3
10
5
50
33
30
22
20
40
60
61
4
x
z
y 3
10
XIIIB
5
3D SENSOR
6
7
70A
70B
DRIVING SECTION
50
68
$t_2$
4C
20
60C
LIGHT SOURCE
62
63
30
40
PD
$t_1$
61
XIIIB
x
y
z 3
10
5
50
68
$t_2$
4C
30
20
40
60C
61
$t_1$
x
z
y

LIGHT EMITTER, LIGHT EMITTING DEVICE, OPTICAL DEVICE, AND INFORMATION PROCESSING APPARATUS

CROSS-REFERENCE TO RELATED APPLICATIONS

This application is based on and claims priority under 35 USC 119 from Japanese Patent Application No. 2019-034456 filed Feb. 27, 2019.

BACKGROUND

(i) Technical Field

The present disclosure relates to a light emitter, a light emitting device, an optical device, and an information processing apparatus.

(ii) Related Art

JP-A-2018-32654 discloses that a vertical resonator-type light emitting element module including plural vertical resonator type light emitting elements arranged on a plane has a joining surface disposed in a region between laser beams from the vertical resonator-type light emitting elements adjacent to each other on a substrate and located on an emitting direction side of the laser beam; and an outer wall facing a beam space through which the laser beam is transmitted.

Incidentally, in order to improve the measurement accuracy, it is necessary for a light source for performing three-dimensional sensing by the time of flight (ToF) method to turn on and off a large current at a higher speed. Therefore, when the wall that supports a diffusion plate that diffuses light from the light source is provided between a driving section and the light source, it is difficult to make the driving section and the light source close to each other because the wall becomes an obstacle. Therefore, it is difficult to reduce the wiring inductance between the driving section and the light source, and the light source becomes a constraint in a case of turning on and off the light source at a high speed.

SUMMARY

Aspects of non-limiting embodiments of the present disclosure relate to providing a light emitter in which a light source and a driving section can be set close to each other as compared with a case where a wall that supports a diffusion plate is also provided between the light source and the driving section, similar to walls at other parts.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a light emitter including: a substrate; a driving section provided on the substrate; a light source that is provided on the substrate and is driven by the driving section; a cover section through which light emitted from the light source is transmitted and that is disposed in an optical axial direction of the light source; and a support section that is provided on a part of the substrate excluding a part between the driving section and the light source and supports the cover section.

BRIEF DESCRIPTION OF THE DRAWINGS

Exemplary embodiments of the present invention will be described in detail based on the following figures, wherein:

FIG. 5A is a plan view, and FIG. 5B is a sectional view taken along line VB-VB of FIG. 5A;

FIG. 7A is a plan view, and FIG. 7B is a sectional view taken along line VIIB-VIIB in FIG. 7A;

FIG. 8A is a plan view, and FIG. 8B is a sectional view taken along line VIIIB-VIIIB in FIG. 8A;

FIG. 9A is a light emitter according to Modification Example 1, FIG. 9B is a light emitter according to Modification Example 2, and FIG. 9C is a light emitter of Modification Example 3;

FIG. 10A is a plan view, and FIG. 10B is a sectional view taken along line XB-XB in FIG. 10A;

FIG. 11A is a plan view, and FIG. 11B is a sectional view taken along line XIB-XIB in FIG. 11A;

FIG. 12A is a plan view, and FIG. 12B is a sectional view taken along line XIIB-XIIB in FIG. 12A;

FIG. 13A is a plan view, and FIG. 13B is a sectional view taken along line XIIIB-XIIIB in FIG. 13A.

DETAILED DESCRIPTION

Hereinafter, a description will be given in detail of exemplary embodiments of the disclosure with reference to the attached drawings.

The information processing apparatus identifies whether or not the user who accessed the information processing apparatus is allowed to access, and only in a case where the user is authenticated as a user who is allowed to access, the use of the apparatus (information processing apparatus) is allowed in many cases. So far, a method of authenticating the user using passwords, fingerprint, iris or the like, has been adapted. In recent years, it has been required to adapt an authentication method having higher security. As this method, authentication using a three-dimensional image, such as the shape of the face of the user or the like, is performed.

Here, the information processing apparatus is described as a portable information processing terminal as an example, and is described as an apparatus that authenticates the user by recognizing the shape of the face captured as a three-dimensional image. In addition, the information processing apparatus may be applied to an information processing apparatus, such as a personal computer (PC), in addition to the portable information terminal.

Furthermore, the configuration, functions, methods, and the like, which are described in the present exemplary embodiment, may also be applied to the recognition of the three-dimensional shape in addition to the recognition of the shape of the face. In other words, the present exemplary embodiment may also be applied to the recognition of the shape of the object other than the face. In addition, the distance to a measurement target does not matter.

First Exemplary Embodiment

Information Processing Apparatus 1

Figure 1:
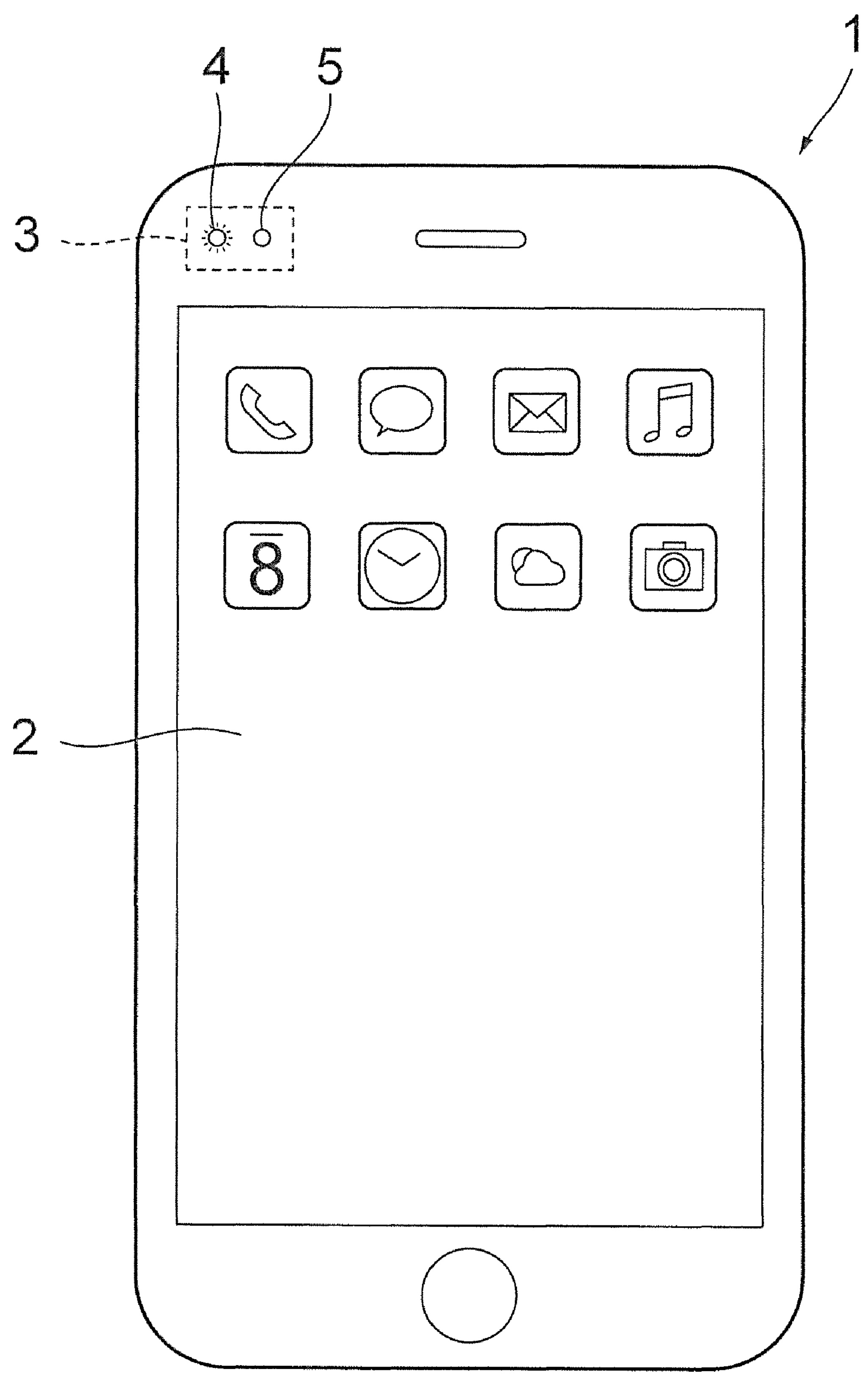
FIG. 1 is a view illustrating an example of an information processing apparatus.

FIG. 1 is a view illustrating an example of an information processing apparatus 1. As described above, the information processing apparatus 1 is a portable information processing terminal as an example.

The information processing apparatus 1 includes: a user interface portion (hereinafter, referred to as UI portion) 2; and an optical device 3 that acquires the three-dimensional image. The UI portion 2 includes, for example, a display device that displays information to the user and an input device with which an instruction for information processing is input by an operation of the user, which are integrated with each other. The display device is, for example, a liquid crystal display or an organic EL display, and the input device is, for example, a touch panel.

The optical device 3 includes a light emitter 4 and a three-dimensional sensor (hereinafter, referred to as 3D sensor) 5. The light emitter 4 emits light toward the measurement target whose three-dimensional image is to be acquired, specifically, the face in the example described here. The 3D sensor 5 acquires the light that is emitted from the light emitter 4, is reflected by the face, and has returned. Here, the three-dimensional image of the face is acquired based on a so-called time of flight (ToF) method using the flight time of the light. Hereinafter, even in a case of acquiring the three-dimensional image of the face, the face will be referred to as the measurement target. In addition, a three-dimensional image other than the face may be acquired. Acquiring the three-dimensional image, is referred to as 3D sensing in some cases.

In addition, the information processing apparatus 1 is configured as a computer including CPU, ROM, RAM and the like. Further, the ROM includes a non-volatile rewritable memory, such as a flash memory. In addition, the accumulated programs or constants in the ROM are developed in the RAM, and by executing the CPU, the information processing apparatus 1 is operated and various types of information processing are executed.

Figure 2:
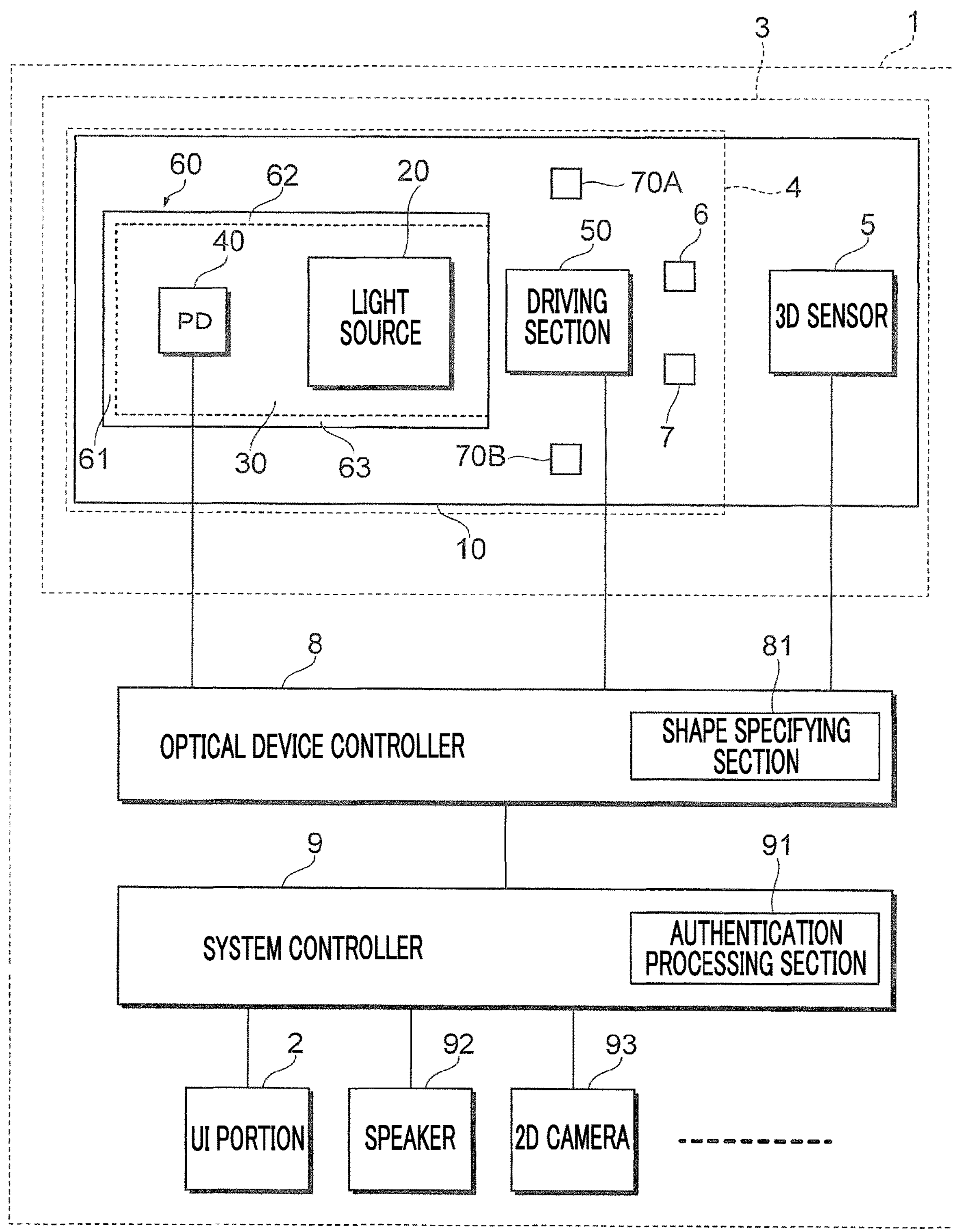
FIG. 2 is a block diagram illustrating a configuration of the information processing apparatus.

FIG. 2 is a block diagram illustrating a configuration of the information processing apparatus 1.

The information processing apparatus 1 includes the above-described optical device 3, an optical device controller 8, and a system controller 9. The optical device controller 8 controls the optical device 3. In addition, the optical device controller 8 includes a shape specifying section 81. The system controller 9 controls the entire information processing apparatus 1 as a system. Further, the system controller 9 includes an authentication processing section 91. In addition, the UI portion 2, a speaker 92, a two-dimensional camera (in FIG. 2, referred to as 2D camera) 93 and the like are connected to the system controller 9. Further, the 3D sensor 5 is an example of a light receiving section, and the optical device controller 8 is an example of a controller.

Hereinafter, a more detailed description will be given.

The light emitter 4 includes a substrate 10, a light source 20, a diffusion plate 30, a light amount monitoring light receiving element (referred as PD in FIG. 2 and the following drawings) 40, a driving section 50, and a support section 60, and a capacitor 70. Here, two capacitors 70 are shown as an example, and in a case of distinguishing the two capacitors, the capacitors 70 will be referred to as capacitors 70A and 70B. The light source 20, the PD 40, the driving section 50, the capacitor 70 are provided on the substrate 10. In addition, the diffusion plate 30 is held by the support section 60 with a predetermined distance from the substrate 10, and is provided to cover the light source 20 and the PD 40. The diffusion plate 30 is an example of a cover section.

In addition, on the substrate 10, the 3D sensor 5, a resistive element 6, and a capacitor 7 are mounted in addition to the above-described members. The resistive element 6 and the capacitor 7 are provided for operating the driving section 50 or the 3D sensor 5. In addition, one resistive element 6 and one capacitor 7 are described respectively, but plural resistive elements 6 and capacitors 7 may be mounted. Further, in FIG. 1, the 3D sensor 5 is also provided on the substrate 10, but the 3D sensor 5 may not be provided on the substrate 10.

The light source 20 in the light emitter 4 includes plural light emitting elements arranged two-dimensionally in the form of a light emitting element array. The light emitting element is a vertical resonator surface light emitting laser element VCSEL (Vertical Cavity Surface Emitting Laser) as an example. Hereinafter, the light emitting element will be described as a vertical resonator surface light emitting laser element VCSEL. The vertical resonator surface light emitting laser element VCSEL will be referred to as VCSEL. The light source 20 emits the light in a direction perpendicular to the substrate 10. In a case of performing the three-dimensional sensing by the ToF method, it is required for the light source 20 to emit pulsed light that is equal to or larger than 100 MHz and has a rise time of 1 ns or less, for example, by the driving section 50. Hereinafter, the emitted pulsed light is referred to as emitted light pulse. In addition, in a case where the face authentication is an example, the distance by which the light is emitted is from approximately 10 cm to approximately 1 m. Further, a range for measuring the 3D shape of the measurement target is approximately 1 square meters. Hereinafter, the distance by which the light is emitted is referred to as a measurement distance, and the range for measuring the 3D shape of the measurement target is referred to as a measurement range or an irradiation range. Further, a surface virtually provided in the measurement range or the irradiation range is referred to as an irradiation surface.

The substrate 10, the diffusion plate 30, the PD 40, the driving section 50, the support section 60, and the capacitor 70 in the light emitter 4 will be described later. In addition, the light source 20 will be described in detail later.

The 3D sensor 5 includes plural light receiving cells. For example, each of the light receiving cells is configured to receive the reflected light from the measurement target with respect to the emission light pulse from the light source 20, and accumulate electric charges that correspond to the time until the reflection light is received for each light receiving cell. Hereinafter, the received reflected light will be referred to as light receiving pulse. The 3D sensor 5 is configured as a device of a CMOS structure in which each light receiving cell includes two gates and a charge accumulation section corresponding to the two gates. In addition, by adding the pulse alternately to the two gates, the generated photoelectrons are transferred to any of the two charge accumulation sections at a high speed. In the two charge accumulation sections, electric charges that correspond to a phase difference between the emission light pulse and the light receiving pulse are accumulated. Further, the 3D sensor 5 outputs a digital value that corresponds to the phase difference between the emission light pulse and the light receiving pulse for each light receiving cell, as a signal, via an AD converter. In other words, the 3D sensor 5 outputs a signal that corresponds to the time until the light is received by the 3D sensor 5 after the light is emitted from the light source 20. In addition, the AD converter may be provided in the 3D sensor 5 or may be provided outside the 3D sensor 5.

The shape specifying section 81 of the optical device controller 8 acquires a digital value obtained from the 3D sensor 5 in each light receiving cell, and calculates the distance to the measurement target for each light receiving cell. In addition, based on the calculated distance, the 3D shape of the measurement target is specified.

The authentication processing section 91 of the system controller 9 performs authentication processing related to the use of the information processing apparatus 1 in a case where the 3D shape of the measurement target specified by the shape specifying section 81 has the 3D shapes accumulated in advance in the ROM or the like. In addition, the authentication processing related to the use of the information processing apparatus 1, as an example, is processing of determining whether or not the use of the information processing apparatus 1 which is the apparatus is allowed. For example, in a case where it is determined that the 3D shape of the face which is the measurement target matches the face shape stored in a storage member, such as the ROM, the use of the information processing apparatus 1 including various applications and the like provided by the information processing apparatus 1 is allowed.

The above-described shape specifying section 81 and the authentication processing section 91 include, for example, a program. Alternatively, the shape specifying section 81 and the authentication processing section 91 may include an integrated circuit, such as ASIC or FPGA. Furthermore, the shape specifying section 81 and the authentication processing section 91 may include software, such as a program, and an integrated circuit, such as ASIC.

In FIG. 2, the optical device 3, the optical device controller 8, and the system controller 9 are illustrated respectively, but the system controller 9 may include the optical device controller 8. In addition, the optical device 3 may include the optical device controller 8. Furthermore, the optical device 3, the optical device controller 8, and the system controller 9 may be integrally formed.

Before description of the light emitter 4, the light source 20, the diffusion plate 30, the PD 40, the driving section 50, and the capacitor 70 that form the light emitter 4 will be described.

Configuration of Light Source 20

Figure 3:
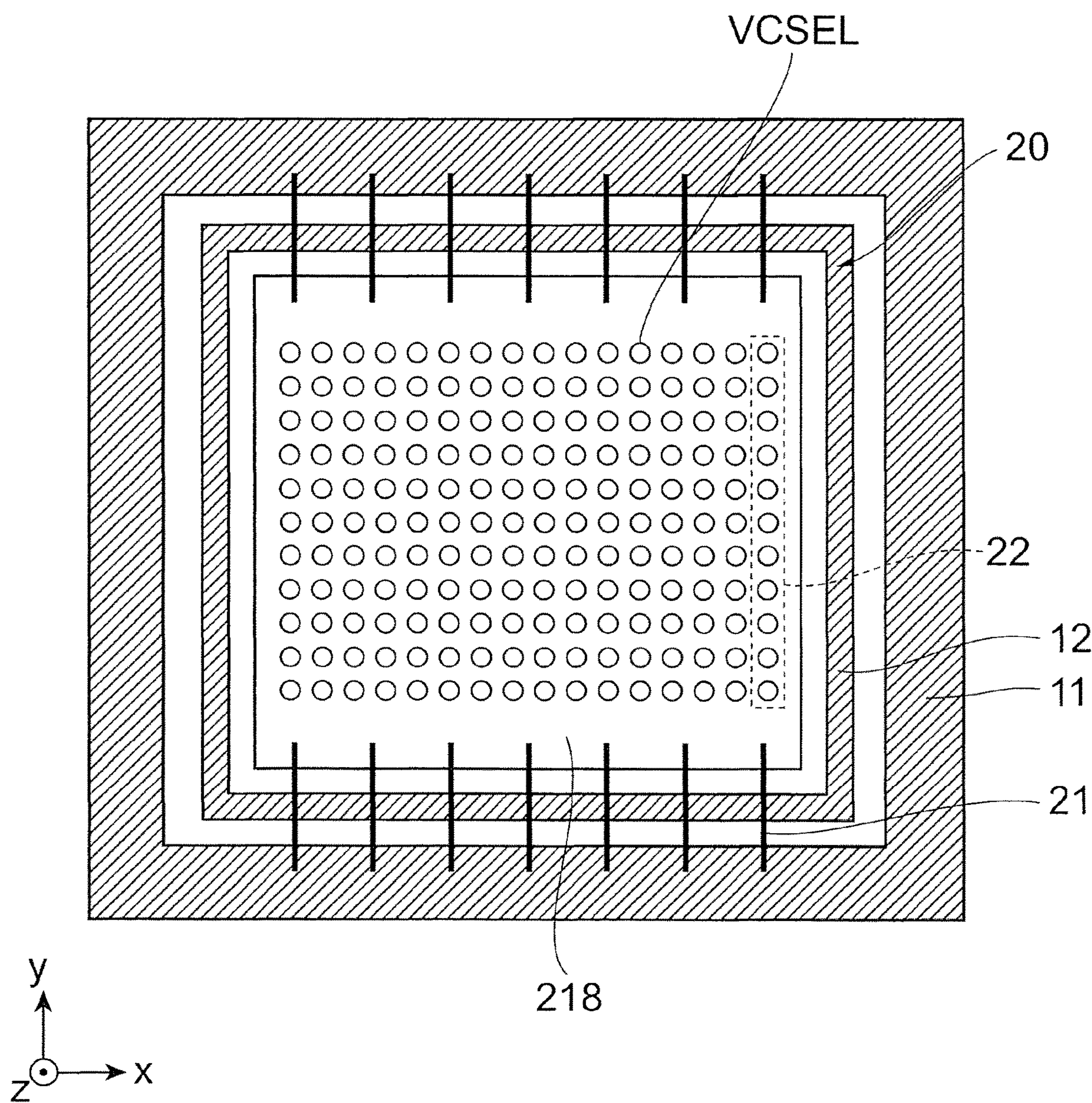
FIG. 3 is a plan view of a light source.

FIG. 3 is a plan view of the light source 20. The light source 20 has a configuration in which plural VCSELs are arranged in a two-dimensional array. A rightward direction of a paper surface is an x direction, and an upward direction of the paper surface is a y direction. A direction orthogonal to the x and y directions counterclockwisely is a z direction.

The VCSEL is a light emitting element which is provided with an active region that is a light emitting region between a lower multilayer film reflecting mirror and an upper multilayer film reflecting mirror which are stacked on a semiconductor substrate 200 (refer to FIG. 4 which will be described later), and which emits the laser light in a direction perpendicular to the semiconductor substrate. Therefore, it is easy to form a two-dimensional array. The number of VCSEL in the light source 20 is, for example, 100 to 1000. In addition, the plural VCSELs are connected to each other in parallel, and are driven in parallel. Further, the above number of VCSELs is an example, and the number of VCSELs may be set in accordance with the measurement distance and measurement range.

On the surface of the light source 20, a common anode electrode 218 (refer to FIG. 4 which will be described later) is provided in the plural VCSELs. In addition, the anode electrode 218 is connected to an anode wiring 11 provided on the substrate 10 via a bonding wire 21. Further, a cathode electrode 214 (refer to FIG. 4 which will be described later) is provided on a rear surface of the light source 20 and bonded to a cathode wiring 12, in which the cathode electrode 214 is provided on the substrate 10, with a conductive adhesive or the like. The conductive adhesive is, for example, a silver paste.

Structure of VCSEL

Figure 4:
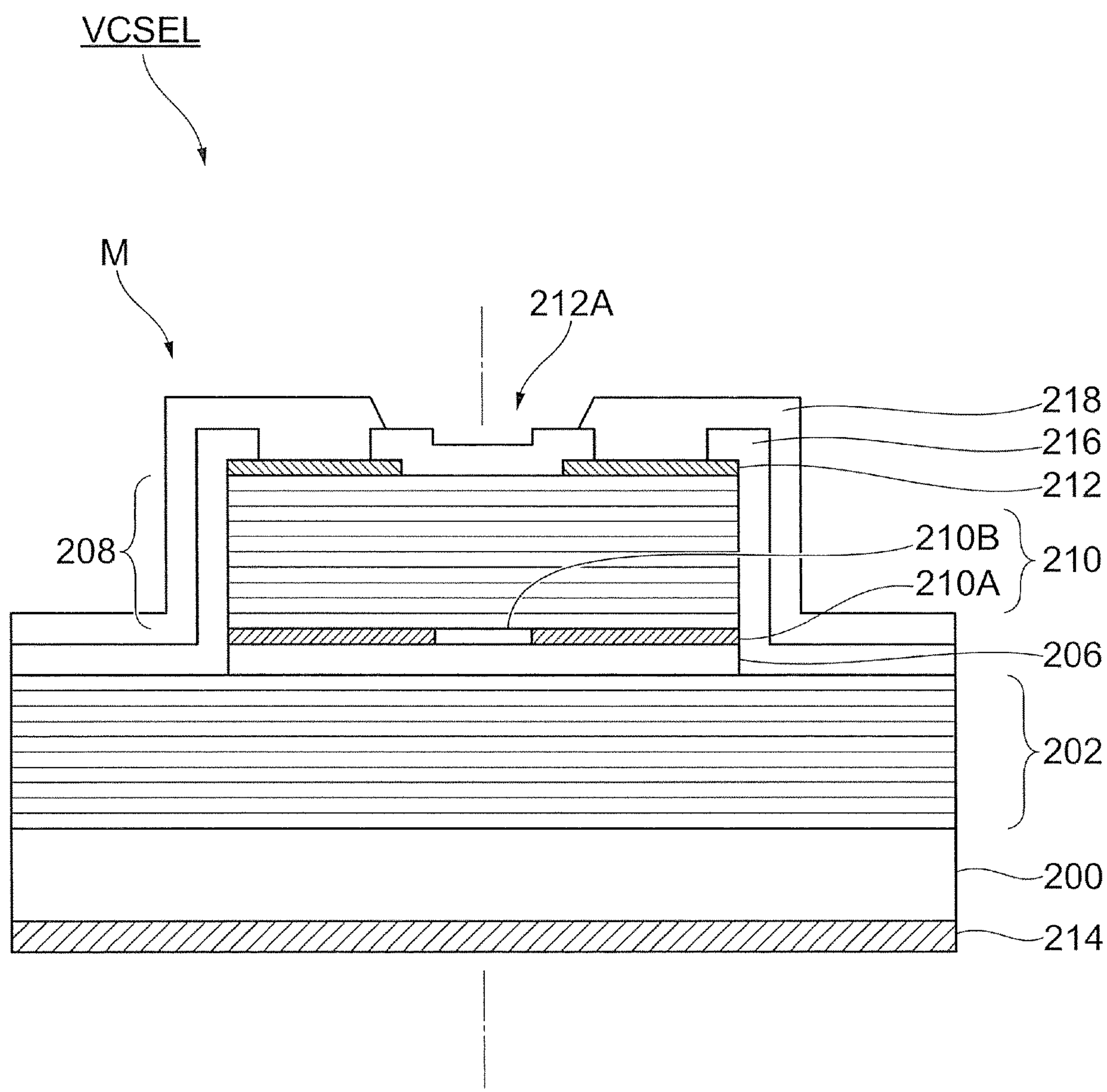
FIG. 4 is a view for illustrating a sectional structure of one VCSEL in the light source.

FIG. 4 is a view for illustrating a sectional structure of one VCSEL in the light source 20. The VCSEL is a VCSEL having a λ, resonator structure. The upward direction of the paper surface is the z direction.

The VCSEL has a configuration in which an n-type lower part distribution Bragg type reflecting mirror (DBR: Distributed Bragg Reflector) 202 in which AlGaAs layers having different Al compositions alternately overlap each other, an active region 206 including a quantum well layer sandwiched between an upper spacer layer and a lower spacer layer, and a p-type upper distribution Bragg type reflecting mirror 208 in which AlGaAs layers having different Al compositions alternately overlap each other, are stacked on the semiconductor substrate 200, such as an n-type GaAs. Hereinafter, the distribution Bragg reflecting mirror will be referred to as DBR.

The n-type lower DBR 202 is a stacked body in which an $Al_{0.9}Ga_{0.1}As$ layer and a GaAs layer are made into one pair, the thickness of each layer is $\lambda/4n_r$ (while λ, is an oscillation wavelength and $n_r$ is a refractive index of a medium), and the layers are stacked alternately in 40 cycles. After doping with silicon, which is an n-type impurity, the carrier concentration is, for example, $3\times10^{18}$ $cm^{-3}$.

The active region 206 has a configuration in which the lower spacer layer, the quantum well active layer, and the upper spacer layer are stacked. For example, the lower spacer layer is an undoped $Al_{0.6}Ga_{0.4}As$ layer, the quantum well active layer is an undoped InGaAs quantum well layer and an undoped GaAs barrier layer, and the upper spacer layer is an undoped $Al_{0.6}Ga_{0.4}As$ layer.

The p-type upper DBR 208 is a stacked body in which a p-type $Al_{0.9}Ga_{0.1}As$ layer and a GaAs layer are made into one pair, the thickness of each layer is $\lambda/4n_r$, and the layers are stacked alternately in 29 cycles. The carrier concentration after doping with carbon which is a p-type impurity is, for example, $3\times10^{18}$ $cm^{-3}$. Preferably, on the uppermost layer of the upper DBR 208, a contact layer made of p-type GaAs is formed, and on the lowermost or on the inside of the upper DBR 208, a current constriction layer 210 of p-type AlAs is formed.

By etching the semiconductor layer stacked from the upper DBR 208 until reaching the lower DBR 202, a cylindrical mesa M is formed on the semiconductor substrate 200. Accordingly, the current constriction layer 210 is exposed on the side surface of the mesa M. By an oxidation step, on the current constriction layer 210, an oxidized region 210A oxidized from the side surface of the mesa M and a conductive region 210B surrounded by the oxidized region 210A are formed. In addition, in the oxidation step, since an AlAs layer has a high oxidation speed than that of the AlGaAs layer and the oxidized region 210A is oxidized substantially at the same speed from the side surface of the mesa M inward, a planar shape parallel to the semiconductor substrate 200 of the conductive region 210B has a shape reflecting the outer shape of the mesa M, that is, a circular shape, and the center thereof substantially matches an axial direction (one-dot chain line) of the mesa M. In addition, in the exemplary embodiment, the mesa M has a columnar structure.

On the uppermost layer of the mesa M, an annular p-side electrode 212 made of metal in which Ti/Au and the like are stacked is formed. The p-side electrode 212 is in ohmic contact with the contact layer provided on the upper DBR 208. The inner side of the annular p-side electrode 212 is a light emission port 212A through which the laser light is emitted to the outside. In other words, in the VCSEL, the light is emitted in a direction perpendicular to the semiconductor substrate 200, and the axial direction of the mesa M is the optical axis. Furthermore, on the rear surface of the semiconductor substrate 200, the cathode electrode 214 is formed as an n-side electrode. In addition, the surface of the upper DBR 208 on the inside of the p-side electrode 212 is a light emitting surface.

In addition, except for the part to which the anode electrode (anode electrode 218 which will be described later) of the p-side electrode 212 is connected and the light emission port 212A, an insulating layer 216 is provided so as to cover the surface of the mesa M. Further, except for the light emission port 212A, the anode electrode 218 is provided so as to be in ohmic contact with the p-side electrode 212. In addition, the anode electrode 218 is provided in common to the plural VCSELs. In other words, each of the p-side electrodes 212 is connected to the plural VCSELs that form the light source 20 by the anode electrode 218 in parallel.

In addition, the VCSEL may oscillate in a single transverse mode, and may oscillate in a multiple transverse mode (multi-mode). As an example, the light output of one of the VCSEL is 4 mW to 8 mW.

A VCSEL group 22 of an end portion in the x direction is a VCSEL positioned on the driving section 50 side illustrated in FIGS. 7A and 7B which will be described later.

Configuration of Diffusion Plate 30

Figure 5A:
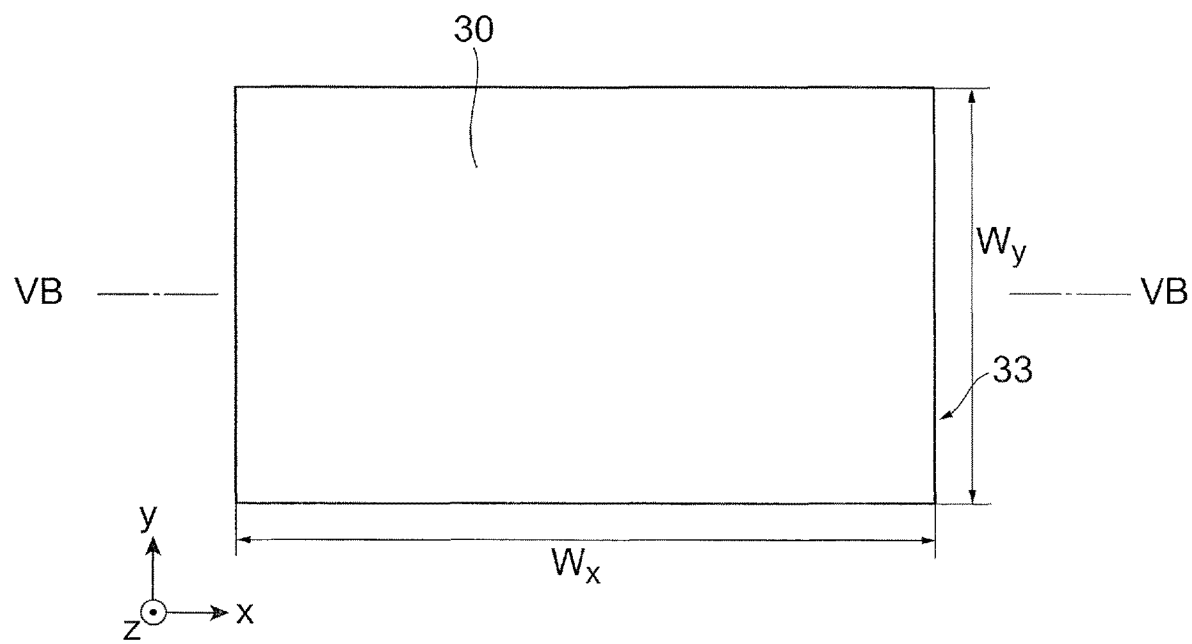
FIGS. 5A and 5B are views for illustrating an example of a diffusion plate.
Figure 5B:
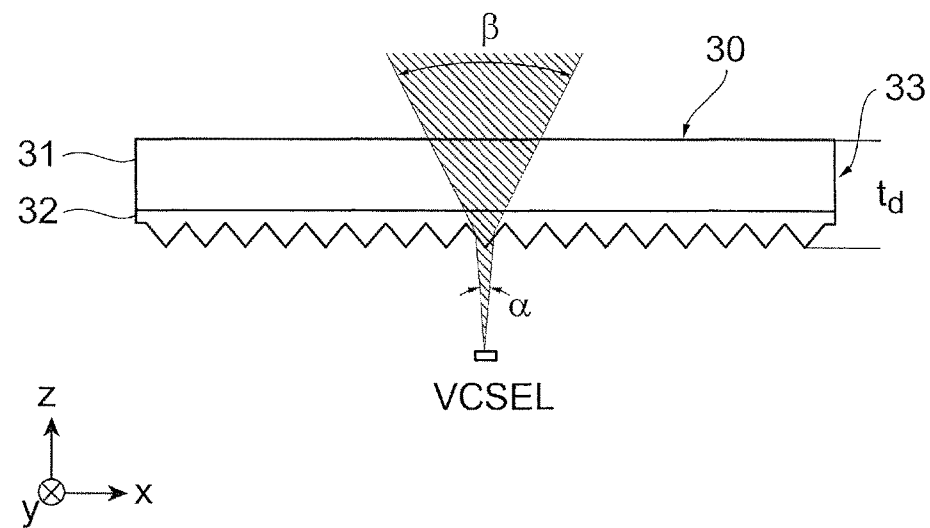

FIGS. 5A and 5B are views for illustrating an example of the diffusion plate 30. FIG. 5A is a plan view, and FIG. 5B is a sectional view taken along line VB-VB of FIG. 5A. In FIG. 5A, a rightward direction of the paper surface is the x direction, and an upward direction of the paper surface is the y direction. A direction orthogonal to the x and y directions counterclockwisely is a z direction. Accordingly, in FIG. 5B, a rightward direction of the paper surface is the x direction, and an upward direction of the paper surface is the z direction.

As illustrated in FIG. 5B, the diffusion plate 30 has both surfaces parallel to each other, and includes a resin layer 32 on which irregularities for diffusing the light to one surface of a flat glass base material 31, here, a −z direction side which is a rear surface, are formed. The diffusion plate 30 further spreads a spread angle of light incident from the VCSEL of the light source 20 and emits the light. In other words, the irregularities formed on the resin layer 32 of the diffusion plate 30, refract or scatter the light, and make a spread angle $\beta$ of the emitted light greater than a spread angle $\alpha$ of the incident light. In other words, as illustrated in FIGS. 5A and 5B, the spread angle $\beta$ of the light emitted from the diffusion plate 30 being transmitted through the diffusion plate 30 becomes greater than the spread angle $\alpha$ of the light emitted from the VCSEL ($\alpha<\beta$). Therefore, when the diffusion plate 30 is used, the area of the surface irradiated with the light emitted from the light source 20 is larger than when the diffusion plate 30 is not used. Further, the light density on the irradiated surface decreases. In addition, the light density refers to an irradiance per unit area, and the spread angles $\alpha$ and $\beta$ are a full width at half maximum (FWHM).

Further, the diffusion plate 30 has, for example, a square planar shape, a width $W_x$ in the x direction and a longitudinal width $W_y$ in the y direction are 1 mm to 10 mm, and a thickness $t_d$ in the z direction is 0.1 mm to 1 mm. In addition, the end portion in the x direction is an end portion 33 of the diffusion plate 30. As will be described in FIGS. 7A and 7B which will be described later, the end portion 33 is the driving section 50 side. In addition, the planar shape of the diffusion plate 30 may be other shapes, such as a polygonal shape or a circular shape. Further, in a case of the size and shape described above, in particular, a light diffusing member that is appropriate for the face authentication of the portable information terminal or the measurements of relatively short distances which are approximately several meters, is provided.

PD 40

The PD 40 is a photodiode that is made from silicon or the like for outputting electric signals that correspond to the amount of light received by it (hereinafter, referred to as the amount of received light). The PD 40 is disposed to receive the light emitted from the light source 20 and reflected by the rear surface (a surface in the −z direction in FIG. 7B which will be described later) of the diffusion plate 30. The light source 20 is controlled to maintain the predetermined light amount and emit the light based on the amount of light received by the PD 40. In other words, as will be described later, the optical device controller 8 monitors the amount of light received by the PD 40, controls the driving section 50, and controls the light amount emitted from the light source 20.

Driving Section 50 and Capacitor 70

In a case where it is desired to drive the light source 20 at a higher speed, it is preferable to perform low side driving. The low side driving indicates a configuration in which driving elements, such as a MOS transistor, is positioned on the downstream side of a current path with respect to a driving target, such as a VCSEL. Conversely, the configuration in which the driving element is positioned on the upstream side is referred to as high side driving.

Figure 6:
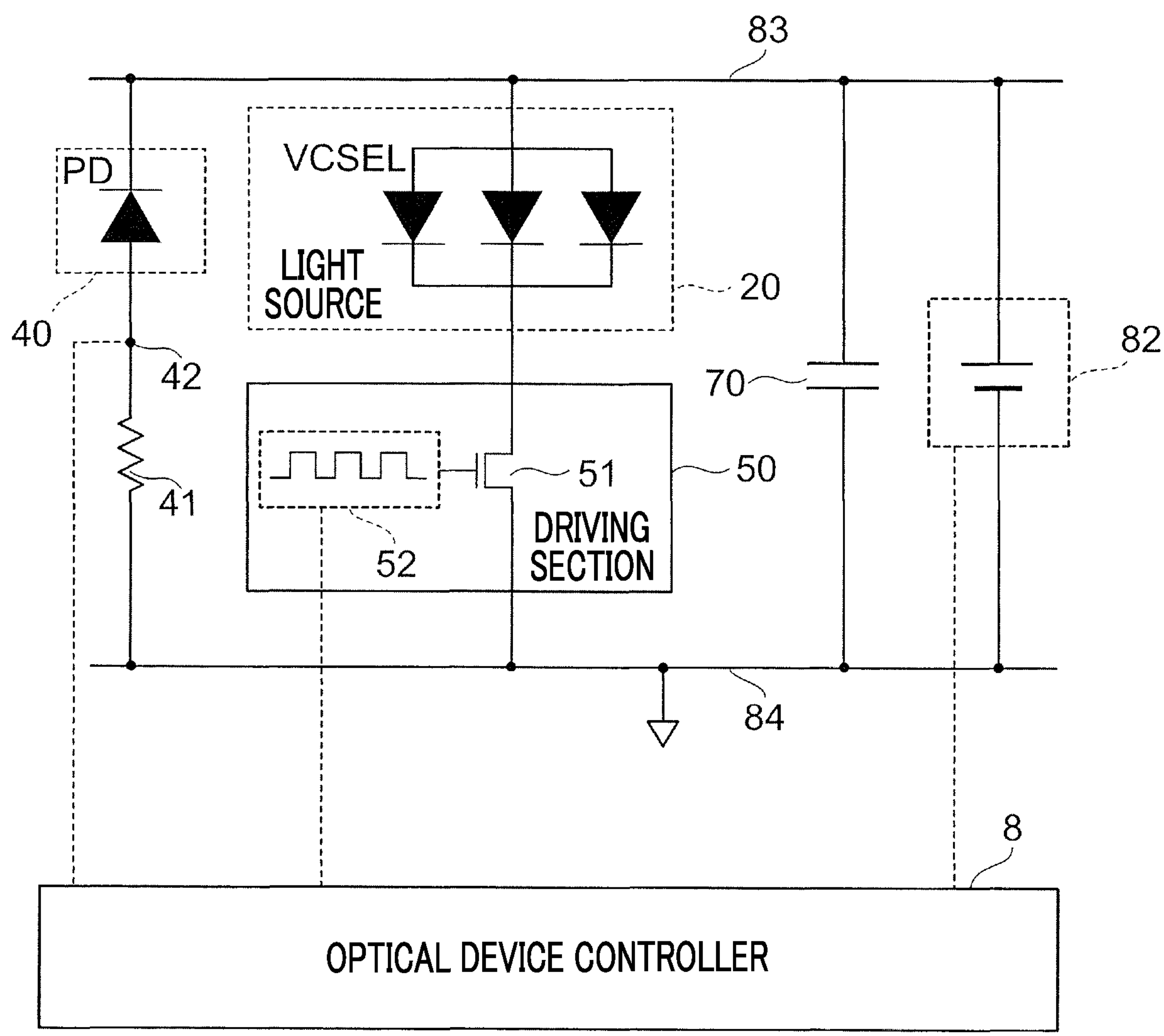
FIG. 6 is a view illustrating an example of an equivalent circuit for driving the light source by low side driving.

FIG. 6 is a view illustrating an example of an equivalent circuit for driving the light source 20 by the low side driving. In FIG. 6, the VCSEL of the light source 20, the driving section 50, the capacitor 70, a power source 82, the PD 40, and a detecting resistive element 41 for detecting a current that flows through the PD 40 are illustrated. In addition, the capacitors 70A and 70B which are referred to in FIG. 2, are connected to the power source 82 in parallel. Accordingly, the capacitors 70A and 70B are not divided and distinguished from each other and are referred to as the capacitor 70.

The power source 82 is provided in the optical device controller 8 illustrated in FIG. 2. The power source 82 generates a DC voltage while a +side is a power source potential and a −side is a ground potential. The power source potential is supplied to a power source line 83, and the ground potential is supplied to a ground line 84.

The light source 20 has a configuration in which the plural VCSELs are connected to each other in parallel as described above. The anode electrode 218 (refer to FIG. 4) of the VCSEL is connected to the power source line 83 via the anode wiring 11 provided on the substrate 10.

The driving section 50 includes an n-channel MOS transistor 51 and a signal generating circuit 52 to turn on and off the MOS transistor 51. The drain of the MOS transistor 51 is connected to the cathode electrode 214 (refer to FIG. 4) of the VCSEL via the cathode wiring 12 provided on the substrate 10. The source of the MOS transistor 51 is connected to the ground line 84. In addition, the gate of the MOS transistor 51 is connected to the signal generating circuit 52. In other words, the VCSEL of the light source 20 and the MOS transistor 51 of the driving section 50 are connected to each other in series between the power source line 83 and the ground line 84. The signal generating circuit 52 generates a signal of "H level" for turning on the MOS transistor 51 and a signal of "L level" for turning off the MOS transistor 51, by the control of the optical device controller 8.

In the capacitor 70, one terminal is connected to the power source line 83, and the other terminal is connected to the ground line 84. In addition, the capacitor 70 includes, for example, an electrolytic capacitor or a ceramic capacitor.

In the PD 40, the cathode is connected to the power source line 83, and the anode is connected to one terminal of the detecting resistive element 41. In addition, the other terminal of the detecting resistive element 41 is connected to the ground line 84. In other words, the PD 40 and the detecting resistive element 41 are connected to each other in series between the power source line 83 and the ground line 84. Further, an output terminal 42 which is a connection point between the PD 40 and the detecting resistive element 41 is connected to the optical device controller 8.

Next, a driving method of the light source 20 which is the low side driving will be described.

First, the signal generated by the signal generating circuit 52 in the driving section 50 is "L level". In this case, the MOS transistor 51 is turned off. In other words, the current does not flow between the source and the drain of the MOS transistor 51. Accordingly, the current does not flow to the VCSEL which are connected to each other in series. The VCSEL is a light non-emitting state.

At this time, the capacitor 70 is charged by the power source 82. In other words, one terminal of the capacitor 70 is the power source potential and the other terminal is the ground potential. In the capacitor 70, the electric charges determined by the capacity, the power source voltage (power source potential−ground potential), and the time, are accumulated.

Next, when the signal generated by the signal generating circuit 52 in the driving section 50 is "H level", the MOS transistor 51 is shifted from OFF to ON. Then, the electric charges accumulated in the capacitor 70 flow (being discharged) to the MOS transistor 51 and the VCSEL connected to each other in series, the VCSEL emits the light.

In addition, when the signal generated by the signal generating circuit 52 in the driving section 50 is "L level", the MOS transistor 51 is shifted from ON to OFF. Accordingly, the light emission of the VCSEL is stopped. Then, the accumulation of the electric charges in the capacitor 70 is resumed by the power source 82.

As described above, each time the signal output from the signal generating circuit 52 shifts to "L level" and "H level", the light non-emission which is the stop of the light emission of the VCSEL and the light emission are repeated. In other words, the light pulse from the VCSEL is emitted.

In addition, without providing the capacitor 70, the electric charges (current) may be directly supplied from the power source 82 to the VCSEL, but by accumulating the electric charges in the capacitor 70, discharging the accumulated electric charges by the switching of the MOS transistor 51, and rapidly supplying the current to the VCSEL, the rise time of the light emission of the VCSEL is shortened. Furthermore, when the distance between the light source 20 and the driving section 50 is reduced so that the inductance of the wiring is lowered, the light source 20 can be turned on and off at a high speed. In addition, the distance between the light source 20 and the driving section 50 may preferably be equal to or less than 1 mm.

The PD 40 is connected in a reverse direction via the detecting resistive element 41 between the power source line 83 and the ground line 84. Therefore, in a state where the light is not emitted, the current does not flow. When the PD 40 receives a part of the light reflected by the diffusion plate 30 in the emitted light of the VCSEL, the current that corresponds to the amount of received light flows in the PD 40. Accordingly, the current that flows through the PD 40 is measured by the voltage of the output terminal 42, and the light intensity of the light source 20 is detected. Here, the optical device controller 8 performs the control such that the light intensity of the light source 20 is a predetermined light intensity according to the amount of light received by the PD 40. In other words, in a case where the light intensity of the light source 20 is lower than the predetermined light intensity, the optical device controller 8 increases the amount of electric charges accumulated in the capacitor 70 by increasing the power source potential of the power source 82, and increases the current that flows to the VCSEL. Meanwhile, in a case where the light intensity of the light source 20 is higher than the predetermined light intensity, by decreasing the power source potential of the power source 82, the optical device controller 8 reduces the amount of electric charges accumulated in the capacitor 70, and reduces the current that flows to the VCSEL. In this manner, the light intensity of the light source 20 is controlled.

Further, in a case where the amount of light receive by the PD 40 has been extremely decreased, there is a concern that the light emitted from the light source 20 is directly emitted to the outside, as the diffusion plate 30 is come off or damaged. In such a case, the optical device controller 8 reduces the light intensity of the light source 20. For example, the emission of the light from the light source 20, that is, the irradiation of the measurement target with the light, is stopped.

In addition, the substrate 10 is, for example, in the form of a multilayer substrate having three layers. In other words, the substrate 10 includes a first conductive layer, a second conductive layer, and a third conductive layer from the side on which the light source 20 or the driving section 50 are mounted. In addition, between the first conductive layer and the second conductive layer and between the second conductive layer and the third conductive layer, the insulating layer is provided. For example, the third conductive layer is the power source line 83 and the second conductive layer is the ground line 84. In addition, the first conductive layer forms a circuit pattern of a terminal or the like to which the anode wiring 11 of the light source 20, the cathode wiring 12, the PD 40, the detecting resistive element 41, the capacitor 70 (capacitors 70A and 70B) and the like are connected. The first conductive layer, the second conductive layer, and the third conductive layer are made of metal, such as copper (Cu) or silver (Ag) or a conductive material, such as a conductive paste containing the metal. The insulating layer is made of, for example, an epoxy resin or a ceramic.

The power source line 83 of the third conductive layer is connected to the anode wiring 11 provided on the first conductive layer through the via, the terminal to which the power source line 83 of the capacitor 70 is connected, the terminal to which the cathode of the PD 40 is connected, and the like, through the via. Similarly, the ground line 84 of the second conductive layer is connected to the terminal to which the source of the MOS transistor 51 of the driving section 50 is connected, the terminal to which the ground line 84 of the detecting resistive element 41 is connected, and the like, through the via. Therefore, the power source line 83 made of the third conductive layer and the ground line 84 made of the second conductive layer prevent variations in the power source potential and the ground potential.

Light Emitter 4

Next, the light emitter 4 will be described in detail.

Figure 7A:
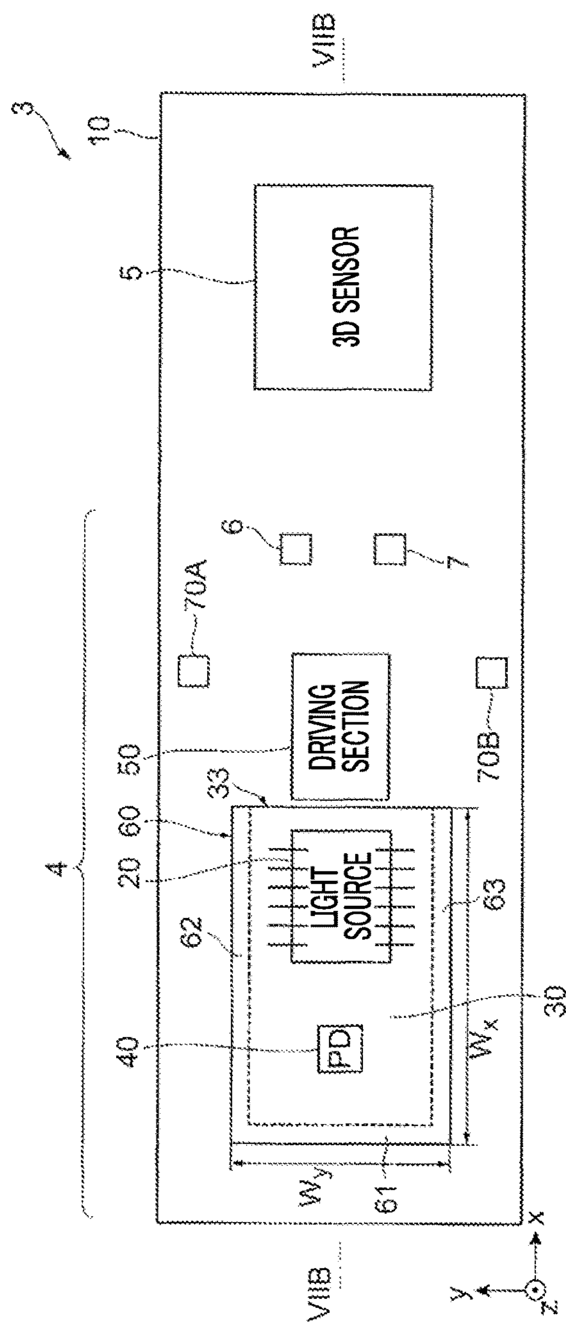
FIGS. 7A and 7B are views for illustrating a light emitter to which a first exemplary embodiment is applied.
Figure 7B:
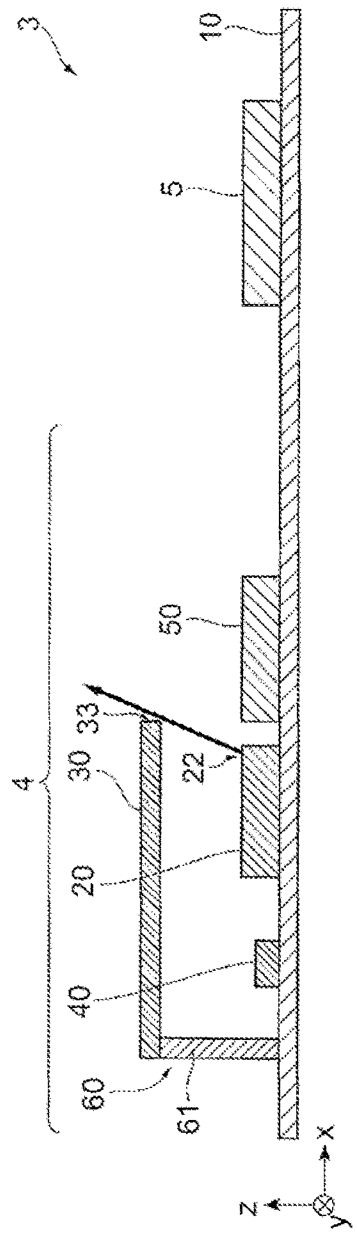

FIGS. 7A and 7B are views for illustrating the light emitter 4 to which a first exemplary embodiment is applied. FIG. 7A is a plan view, and FIG. 7B is a sectional view taken along line VIIB-VIIB in FIG. 7A. Here, in FIG. 7A, a rightward direction of the paper surface is the x direction, and an upward direction of the paper surface is the y direction. A direction orthogonal to the x and y directions counterclockwisely is a z direction. Accordingly, in FIG. 7B, a rightward direction of the paper surface is the x direction, and an upward direction of the paper surface is the z direction. The same will also be applied in similar drawings below.

As described above, the light emitter 4 includes the substrate 10, the light source 20, the diffusion plate 30, the PD 40, the driving section 50, and the support section 60. In addition, on the substrate 10 of the light emitter 4, the circuit member, such as the 3D sensor 5, the resistive element 6, and the capacitor 7, is also mounted. In addition, on the substrate 10, as described above, the wirings for connecting the light source 20, the PD 40, the driving section 50, the 3D sensor 5, the resistive element 6, the capacitor 7 and the like, such as the anode wiring 11 and the cathode wiring 12, are provided.

In the light emitter 4, for example, the PD 40, the light source 20, and the driving section 50 are disposed in this order in the +x direction on the substrate 10. In addition, the diffusion plate 30 is provided so as to cover the light source 20 and the PD 40. Further, the diffusion plate 30 does not cover the driving section 50, the 3D sensor 5, the resistive element 6, and the capacitor 7. In other words, the circuit member that is not covered with the diffusion plate 30 is mounted on the substrate 10. The diffusion plate 30 covers a part of the substrate 10 and does not cover the entire substrate 10.

The light source 20 may be directly mounted on the substrate 10 on which the above-described circuit pattern or the like is formed. In addition, the light source 20 is provided on a heat dissipation substrate made of a heat dissipation base material, such as aluminum oxide or aluminum nitride, and the heat dissipation substrate may be mounted on the substrate 10. Further, the light source 20 may be mounted on the substrate of which a part at which the light source 20 is mounted is recessed. Here, the substrate 10 includes a circuit board having the circuit pattern, a circuit board including a heat dissipation substrate, a substrate recessed for mounting the light source 20, or the like.

As illustrated in FIG. 7B, the diffusion plate 30 is supported by the support section 60 with a predetermined distance from the light source 20. The support section 60 includes wall portions 61, 62, and 63. The wall portion 61 is provided on the PD 40 side, and the wall portions 62 and 63 are provided so as to face the +y side and −y side of the light source 20. The wall portion 61 forms a yz plane, and the wall portions 62 and 63 form a zx plane. In addition, the wall portions 61, 62, and 63 are connected to each other on the side surface. In other words, in a case of being viewed in the −z direction, a sectional shape on an xy plane of the support section 60 is a U shape, and the driving section 50 side is an opening. In other words, between the light source 20 and the driving section 50, the wall portion is not provided. Here, a case where the wall portion is not provided between the light source 20 and the driving section 50 is referred to as a case where the support section 60 is not provided between the light source 20 and the driving section 50. In addition, in a case of not distinguishing the wall portions 61, 62, and 63 respectively, there is a case where the wall portions 61, 62, and 63 are referred to as the wall portions or walls.

In addition, as illustrated in FIGS. 7A and 7B, the three sides of the diffusion plate 30 having a square planar shape are supported by the wall portions 61, 62, and 63. The support section 60 is, for example, a single member integrally molded with a resin material such as a liquid crystal polymer or a ceramic, the thickness of the wall portion is 300 μm, and the height of the wall portion is 450 to 550 μm. In addition, the support section 60 is made in a black color or the like so as to absorb the light emitted from the light source 20. Further, one end surface of the wall portion of the support section 60 is bonded to the substrate 10, and the other end surface is bonded to the diffusion plate 30.

As illustrated in FIGS. 7A and 7B, between the light source 20 and the driving section 50, the wall portion, that is, the support section 60, is not provided. In such a structure, the light source 20 and the driving section 50 are disposed close to each other, so that the wiring for supplying the current for the light emission from the driving section 50 to the light source 20 is shortened, and the wiring inductance is reduced. Accordingly, the light source 20 is turned on and off at a high speed.

As illustrated in FIG. 7B, the PD 40 is covered with the diffusion plate 30 together with the light source 20. Accordingly, the PD 40 receives a part of the light reflected by the diffusion plate 30 in the light emitted from the light source 20. Therefore, as described in FIG. 6, the PD 40 detects (monitors) the intensity of the light emitted from the light source 20.

Light Emitter 4' for Comparison

Figure 8A:
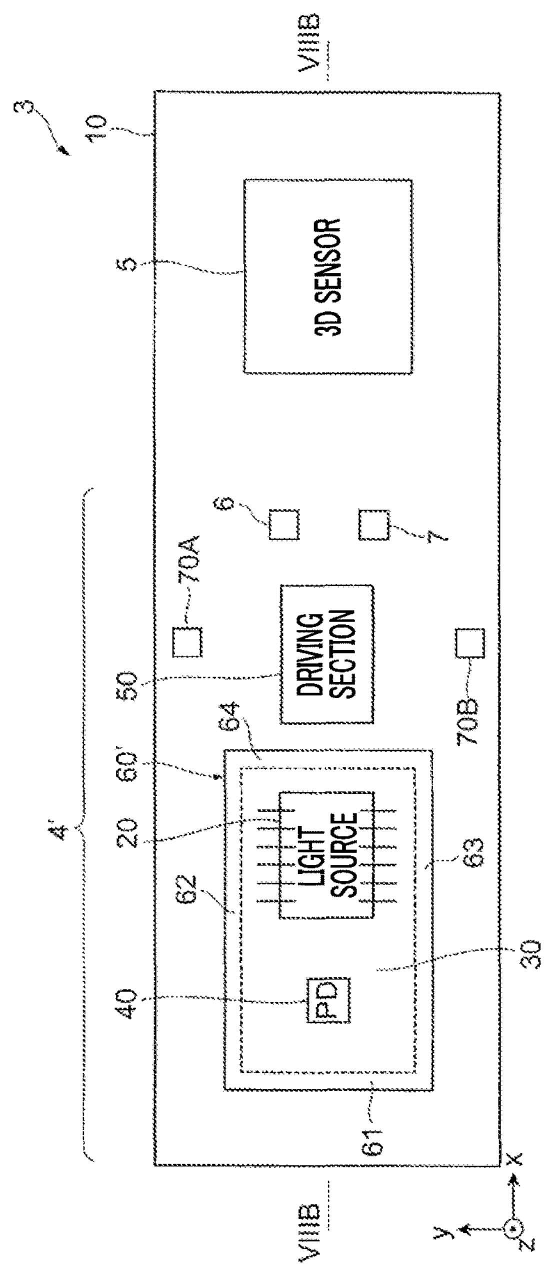
FIGS. 8A and 8B are views for illustrating a light emitter illustrated for comparison.
Figure 8B:
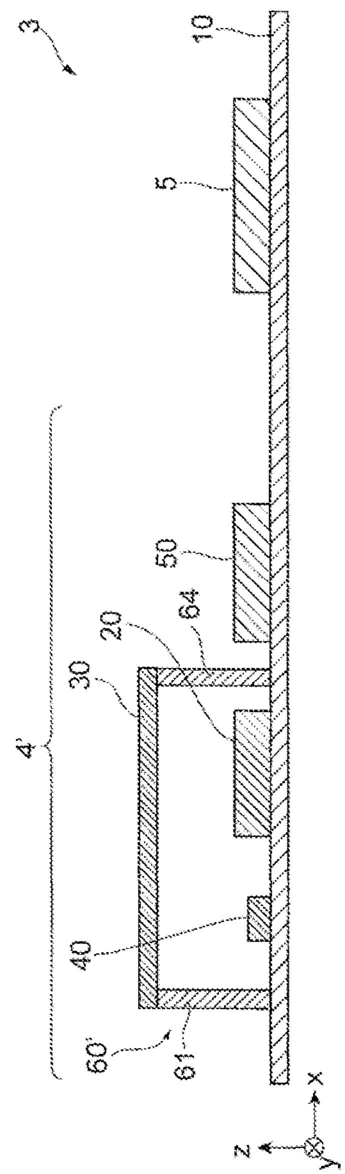

FIGS. 8A and 8B are views for illustrating a light emitter 4' illustrated for comparison. FIG. 8A is a plan view, and FIG. 8B is a sectional view taken along line in FIG. 8A. Hereinafter, parts different from the light emitter 4 to which the first exemplary embodiment illustrated in FIGS. 7A and 7B is applied will be described.

In the light emitter 4' illustrated in FIGS. 8A and 8B, a support section 60' includes a wall portion 64 in addition to the wall portions 61, 62, and 63. The wall portion 64 is provided on the driving section 50 side, and forms the yz plane. In addition, the wall portions 61, 62, 63, and 64 are connected to each other on the side surface. In other words, the sectional shape of the support section 60 in the z direction forms sides of the square. In addition, the light source 20 and the PD 40 are surrounded by the wall portions 61, 62, 63, and 64 of the support section 60. Therefore, as compared with a case where the support section 60 supports the diffusion plate 30 by three sides in the light emitter 4, a support section 60' of the light emitter 4' is likely to more reliably support the diffusion plate 30. However, in the light emitter 4', between the light source 20 and the driving section 50, the wall portion 64 of the support section 60' exists. In other words, in the light emitter 4', between the light source 20 and the driving section 50, the support section 60' exists. Therefore, the distance between the light source 20 and the driving section 50 should be set to be equal to or greater than the thickness of the wall portion 64. As described above, when the thickness of the wall portion is 300 μm, the wiring for supplying the current for the light emission from the driving section 50 to the light source 20 becomes longer than 300 μm that corresponds to at least the thickness of the wall portion 64. Therefore, there is a concern that an increase in wiring inductance becomes a constraint in a case of turning on and off the light source 20 at a high speed.

The light emitter 4 to which the first exemplary embodiment illustrated in FIGS. 7A and 7B is applied does not include the support section between the light source 20 and the driving section 50. Therefore, as indicated by an arrow in FIG. 7B, there is a concern that the light emitted to the driving section 50 side from the light source 20 is emitted to the outside without being transmitted through the diffusion plate 30. In particular, there is a concern that the light having a high intensity is emitted to the outside from the VCSEL group 22 that is illustrated being surrounded by broken lines in FIG. 3 and provided in the end portion on the driving section 50 side of the light source 20. In addition, light intensity is sometimes referred to as emission intensity.

Here, the position of the end portion 33 on the driving section 50 side of the diffusion plate 30 may be set such that the light having an emission intensity of 50% or higher, which is the intensity of the light emitted by the VCSEL group 22, is incident on the diffusion plate 30. With such setting, the intensity of the light emitted to the outside without being diffused by the diffusion plate 30 is set to be lower than 50% of the intensity (emission intensity) of the light emitted by the VCSEL. With such setting, light with a high intensity is prevented from being applied from the light source 20 to the measurement target.

Furthermore, the position of the end portion 33 on the driving section 50 side of the diffusion plate 30 may be set such that the light having an intensity (emission intensity) of 0.1% or higher emitted by the VCSEL group 22 is incident on the diffusion plate 30. With such setting, the intensity of the light emitted to the outside without being diffused by the diffusion plate 30 is set to be lower than 0.1% of the intensity (emission intensity) of the light emitted by the VCSEL. With such setting, light with a high intensity is prevented from being applied from the light source 20 to the measurement target. In this case, when the spread angles of the light emitted by the VSCEL are the same, the diffusion plate 30 may extend to the side on which a support wall of the support section 60 is not provided, that is, the driving section 50 side.

Modification Example of Light Emitter 4

A modification example of the light emitter 4 to which the first exemplary embodiment illustrated in FIGS. 7A and 7B is applied will be described.

In the light emitter 4, the diffusion plate 30 covers the light source 20 and the PD 40, and does not cover the driving section 50. In the modification example of the light emitter 4 to which the first exemplary embodiment is applied, the diffusion plate 30 covers a part of the driving section 50.

Figure 9A:
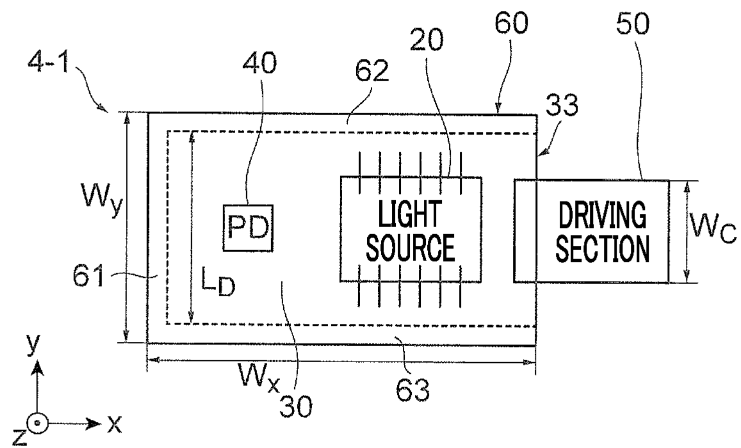
FIGS. 9A to 9C are plan views for illustrating a modification example of the light emitter to which the first exemplary embodiment is applied.
Figure 9B:
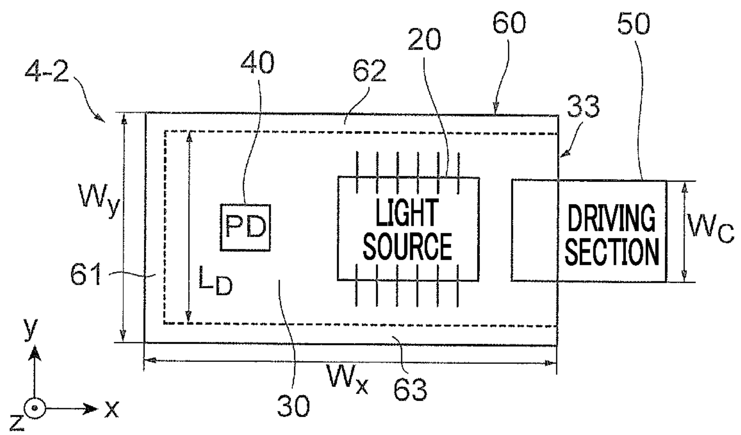
Figure 9C:
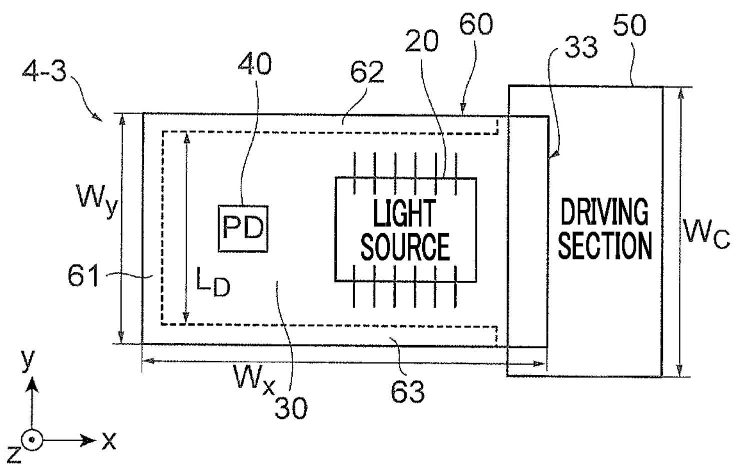

FIGS. 9A to 9C are plan views for illustrating the modification example of the light emitter 4 to which the first exemplary embodiment is applied. FIG. 9A is a light emitter 4-1 according to Modification Example 1, FIG. 9B is a light emitter 4-2 according to Modification Example 2, and FIG. 9C is a light emitter 4-3 according to Modification Example 3. In addition, in FIGS. 9A to 9C, only the light source 20, the diffusion plate 30, the PD 40, the driving section 50, and the support section 60 are referred to. Further, the same parts as the light emitter 4 illustrated in FIGS. 7A and 7B will be given the same reference numerals, and the description thereof will be omitted.

In the light emitter 4-1 according to Modification Example 1 illustrated in FIG. 9A, the diffusion plate 30 overhangs to the one end portion on the light source 20 side of the driving section 50 and also covers a part of the driving section 50. In the light emitter 4-2 according to Modification Example 2 illustrated in FIG. 9B, the diffusion plate 30 overhangs to the center portion of the driving section 50 and covers the center portion of the driving section 50. In the light emitters 4-1 and 4-2, with the overhang of the diffusion plate 30, the wall portions 62 and 63 of the support section 60 overhang to the driving section 50 side. In addition, three sides of the diffusion plate 30 are supported by the wall portions 61, 62, and 63 of the support section 60. The light emitters 4-1 and 4-2 are applied to a case where a width $W_C$ of the driving section 50 is smaller than a width $W_y$ of the diffusion plate 30, and more strictly speaking, a distance $L_D$ between the wall portions 62 and 63.

In the light emitter 4-3 according to Modification Example 3 illustrated in FIG. 9C, the diffusion plate 30 also overhangs to the one end portion of the driving section 50 and covers a part of the driving section 50. However, the wall portions 62 and 63 of the support section 60 are not provided at the part at which the diffusion plate 30 overhangs on the driving section 50. In other words, the light emitter 4-3 is applied to a case where the width $W_C$ of the driving section 50 is greater than the width $W_y$ of the diffusion plate 30, and more strictly speaking, the distance $L_D$ between the wall portions 62 and 63.

In the light emitters 4-1 to 4-3, three sides of the diffusion plate 30 are supported by the wall portions 61, 62, and 63 of the support section 60, and the support wall, that is, the support section, is not provided between the light source 20 and the driving section 50. In addition, as the diffusion plate 30 overhangs on the driving section 50 side, the distance between the VCSEL group 22 provided in the end portion on the driving section 50 side of the light source 20 and the end portion 33 of the diffusion plate 30 becomes greater. Accordingly, light with a high intensity can be easily prevented from being applied from the end portion of the diffusion plate 30. For example, in a case where the light transmitted through the diffusion plate 30 is equal to or higher than 50%, the light emitter 4-1 may be used, and in a case where the light transmitted through the diffusion plate 30 is equal to or higher than 0.1%, the light emitter 4-2 may be used, selectively.

Second Exemplary Embodiment

In a light emitter 4A to which a second exemplary embodiment is applied, a beam portion provided to extend to the driving section 50 side from the diffusion plate 30 side is provided on the driving section 50 side of the diffusion plate 30.

Figure 10A:
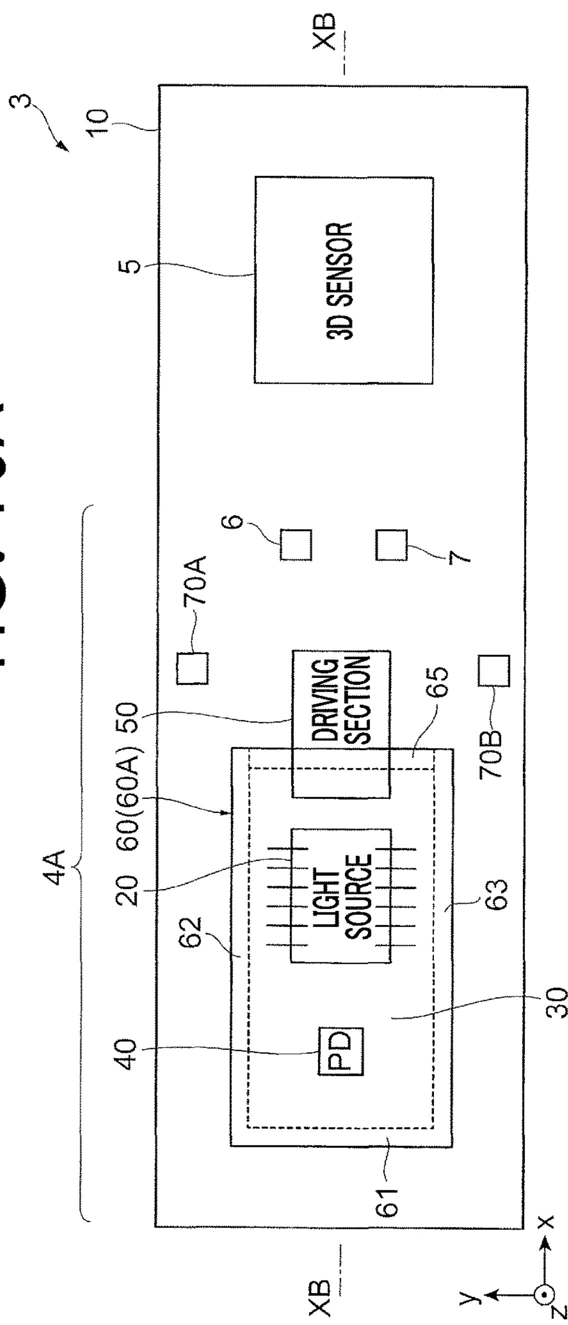
FIGS. 10A and 10B are views for illustrating a light emitter to which a second exemplary embodiment is applied.
Figure 10B:
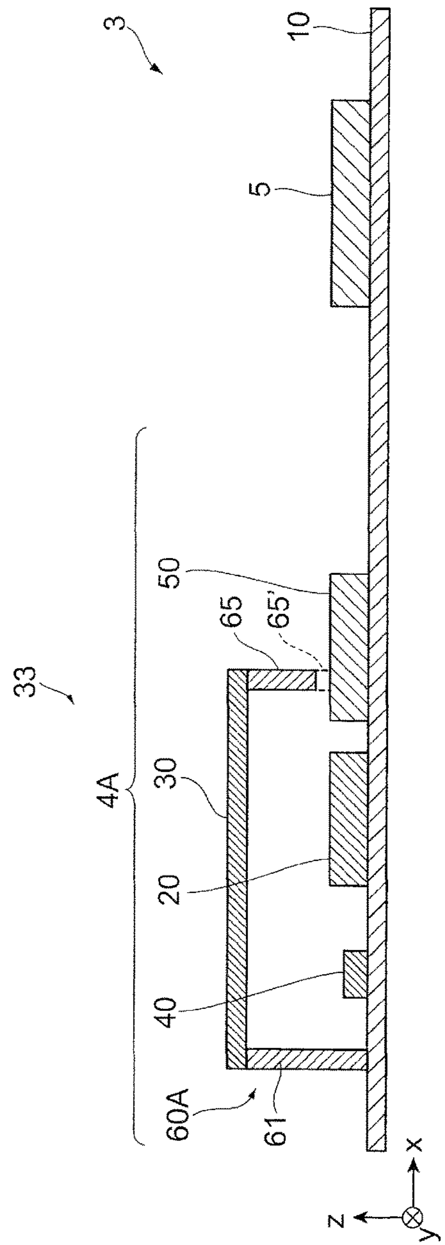

FIGS. 10A and 10B are views for illustrating the light emitter 4A to which the second exemplary embodiment is applied. FIG. 10A is a plan view, and FIG. 10B is a sectional view taken along line XB-XB of FIG. 10A. The same parts as the light emitter 4 illustrated in FIGS. 7A and 7B will be given the same reference numerals, and the description thereof will be omitted.

As illustrated in FIG. 10A, the diffusion plate 30 covers the light source 20 and the PD 40, and covers a part of the surface of the driving section 50. In addition, a support section 60A is provided with the wall portions 61, 62, and 63 for supporting the three sides of the diffusion plate 30 with respect to the substrate 10. Further, the light emitter 4A includes a beam portion 65 provided toward the driving section 50 side from the one remaining side of the diffusion plate 30. As illustrated in FIG. 10B, an upper surface (a surface that faces the +z direction) of the beam portion 65 is bonded to the diffusion plate 30. In addition, in the beam portion 65, a lower surface on the substrate 10 side (a surface that faces the −z direction) has a distance to the surface (a surface that faces the +z direction) of the driving section 50. In addition, instead of the beam portion 65, similar to a beam portion 65' illustrated by broken lines, the beam portion may be in contact with the driving section 50.

The support section 60 (wall portions 61, 62, and 63) and the beam portion 65 (beam portion 65') may be formed as a single member by the integral molding. Accordingly, as compared with a case of assembling plural support members, the number of assembling steps is reduced. In addition, the support section 60 (wall portions 61, 62, and 63) and the beam portion 65 (beam portions 65') formed as a single member will be referred to as the support section 60A.

When the beam portion 65 (beam portion 65') is made of a light absorbing material, light with a high intensity from the VCSEL group 22 of the end portion on the driving section 50 side of the light source 20 is prevented from going outside without being transmitted through the diffusion plate 30. In other words, as compared with a case where the beam portion 65 (65') is not provided, the overhang of the diffusion plate 30 to the driving section 50 side may be reduced. In other words, the area of the diffusion plate 30 is reduced.

Further, similar to the beam portion 65', with a configuration in which the lower surface is in contact with the driving section 50, the diffusion plate 30 is reliably supported by the wall portions 61, 62, and 63 and the beam portion 65' of the support section 60. In addition, the entry of foreign matters, such as dust or dirt, to the surrounding of the light source 20 is prevented. In addition, since the support section 60A and the beam portion 65 are formed as a single member, the number of assembling steps can be reduced.

Third Exemplary Embodiment

In the light emitter 4 to which the first exemplary embodiment is applied, the diffusion plate 30 is supported by the support section 60 with three sides. In a light emitter 4B to which a third exemplary embodiment is applied, the diffusion plate 30 is supported by a support section 60B with four sides.

Figure 11A:
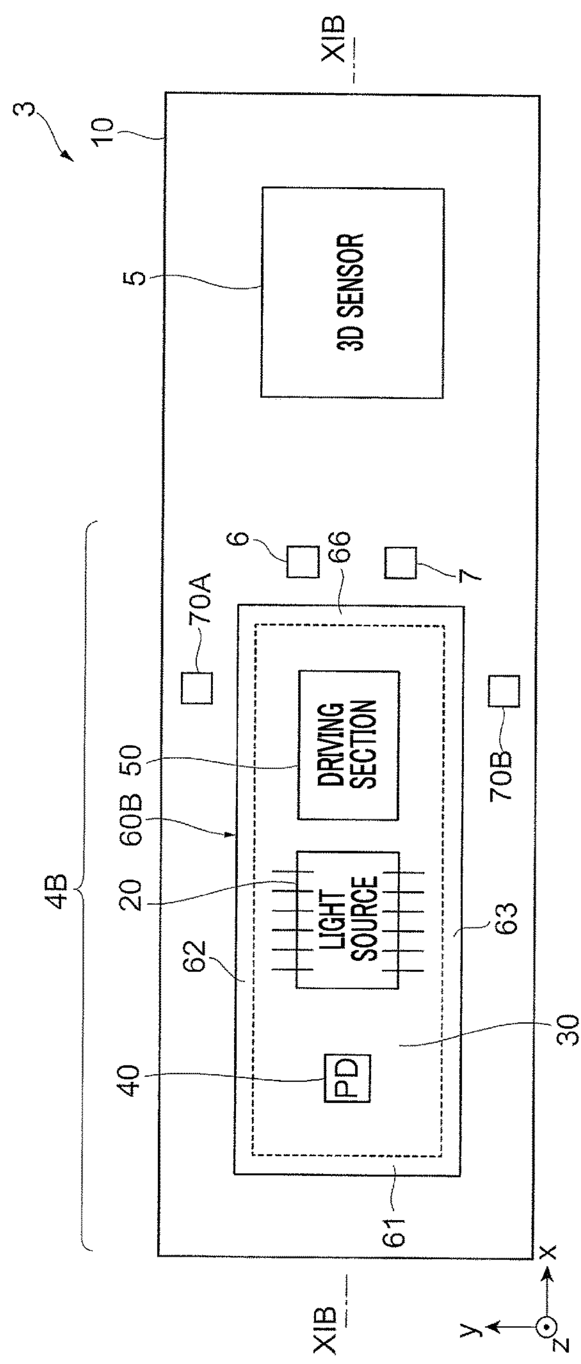
FIGS. 11A and 11B are views for illustrating a light emitter to which a third exemplary embodiment is applied.
Figure 11B:
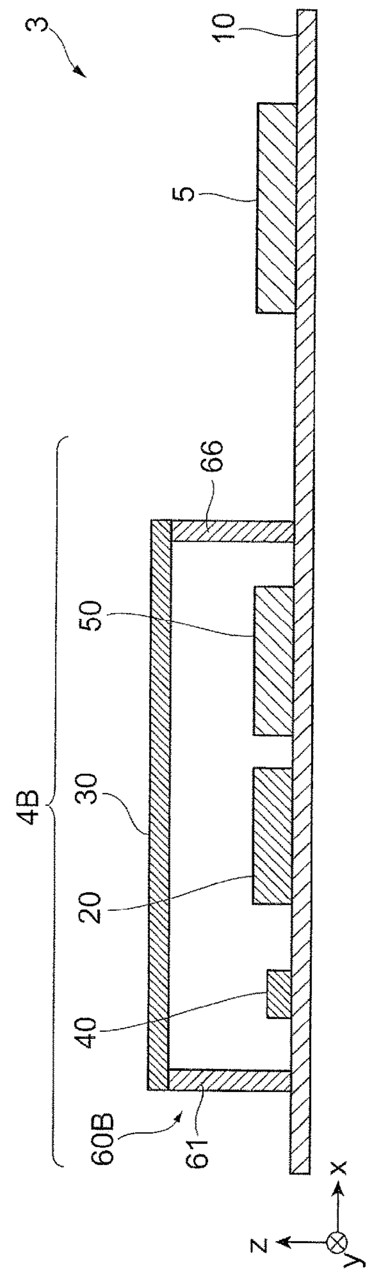

FIGS. 11A and 11B are plan views of the light emitter 4B to which the third exemplary embodiment is applied. FIG. 11A is a plan view, and FIG. 11B is a sectional view taken along line XIB-XIB of FIG. 11A. The same parts as the light emitter 4 illustrated in FIGS. 7A and 7B will be given the same reference numerals, and the description thereof will be omitted.

In the light emitter 4B, the light source 20, the PD 40, and the driving section 50 are covered with the diffusion plate 30. In addition, the support section 60B includes the wall portions 61, 62, 63, and 66, which support the diffusion plate 30 on four sides and are provided to surround the light source 20, the PD 40, and the driving section 50. In addition, the support section 60B (wall portions 61, 62, 63, and 66) is formed as a single member by integral molding. The support section 60B is made of a light absorbing material.

In this case, in the light source 20 of the light emitter 4B, the optical axial direction side is covered with the diffusion plate 30, and the side surface side is covered with the support section 60. Since the support section 60B is made of the light absorbing material, the light emitted from the light source 20 is prevented from leaking directly to the outside. In addition, since the support section 60B is formed as a single member, the number of assembling steps can be reduced.

Modification Example of Light Emitter 4B

In the light emitter 4B to which the third exemplary embodiment is applied, the diffusion plate 30 also covers the driving section 50. In general, in the diffusion plate 30, the greater the area, the higher the price. In addition, the diffusion plate 30 is not required to cover the driving section 50. Here, in a light emitter 4B-1 which is a modification example of the light emitter 4B, a blocking section 67 for blocking the transmission of the light is provided at a part of the upper side of the support section 60B of the light emitter 4B, and the area of the diffusion plate 30 is reduced.

Figure 12A:
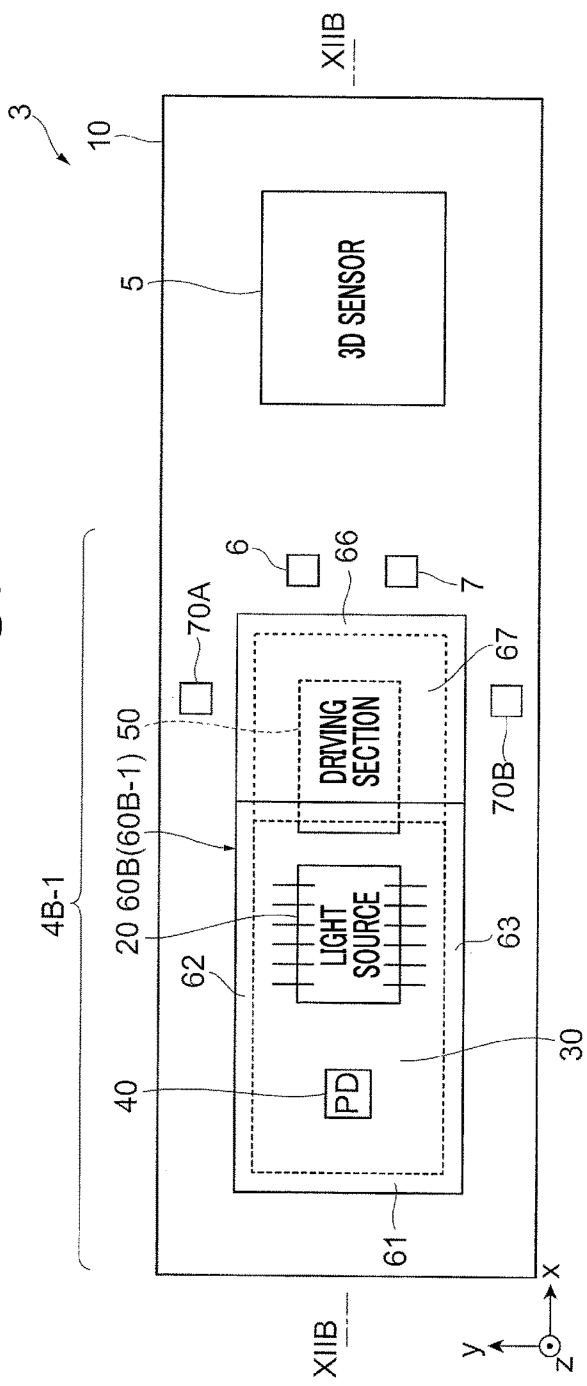
FIGS. 12A and 12B are views for illustrating a light emitter which is a modification example of the light emitter to which the third exemplary embodiment is applied.
Figure 12B:
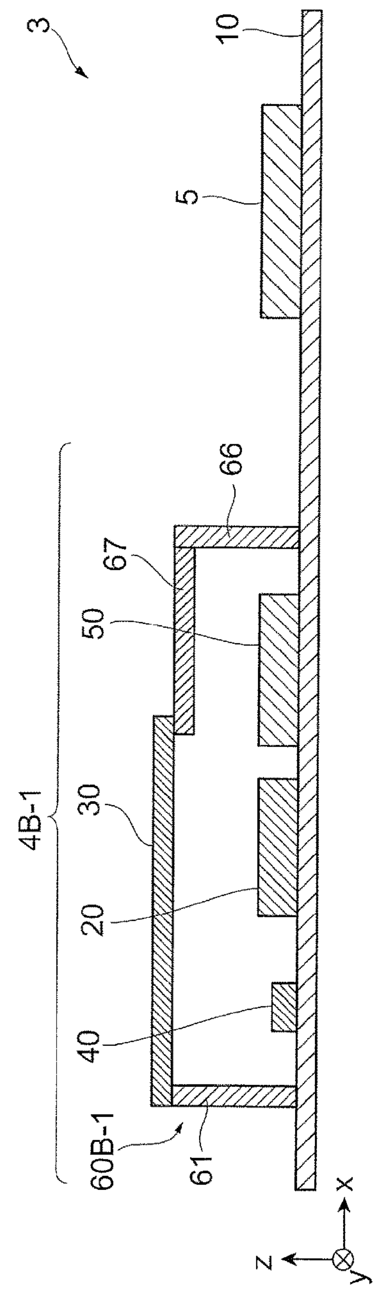

FIGS. 12A and 12B are views for illustrating the light emitter 4B-1 which is the modification example of the light emitter 4B to which the third exemplary embodiment is applied. FIG. 12A is a plan view, and FIG. 12B is a sectional view taken along line XIIB-XIIB of FIG. 12A. The same parts as the light emitter 4B illustrated in FIGS. 11A and 11B will be given the same reference numerals, and the description thereof will be omitted.

In the light emitter 4B-1, the diffusion plate 30 is provided only on the optical axial direction side of the light source 20, and the driving section 50 is not covered with the diffusion plate 30 and is covered with the blocking section 67. As illustrated in FIG. 12A, similar to the support section 60B of the light emitter 4B, the light emitter 4B-1 is provided with the wall portions 61, 62, 63, and 66. In addition, the blocking section 67 is provided at a part of an upper opening of the support section 60B (FIG. 12A). The blocking section 67 is on the wall portion 66 side so as to not to block the light emitted from the light source 20 and transmitted through the diffusion plate 30, and is provided to cover the driving section 50. In addition, the surface (a surface that faces the +z direction) of the blocking section 67 is formed as a surface flush with the surfaces of the wall portions 61, 62, 63, and 66. Further, the rear surface (a surface that faces the −z direction) of the blocking section 67 is provided not to be in contact with the driving section 50. In addition, the support section 60 (wall portions 61, 62, 63, and 66) and the blocking section 67 are formed as a single member by the integral molding. The diffusion plate 30 is bonded and fixed to the wall portion 61 side which is a part of the upper surfaces of the wall portions 61, 62, and 63 and the surface of the blocking section 67. In other words, the diffusion plate 30 is provided so as to seal the opening made by the wall portions 61, 62, and 63 and the blocking section 67. In this manner, the support section 60B and the blocking section 67 which became a single member are referred to as a support section 60B-1.

Even in the light emitter 4B-1, in the light source 20, the optical axial direction side is covered with the diffusion plate 30, and the side surface side is covered with the support section 60B-1. Since the support section 60B-1 includes the light absorbing material, the light emitted from the light source 20 is prevented from leaking directly to the outside. In addition, as compared with the diffusion plate 30 of the light emitter 4B, the area of the diffusion plate 30 becomes smaller. Accordingly, the price of the optical device 3 is reduced. In addition, since the support section 60B (wall portions 61, 62, 63, and 66) and the blocking section 67 are formed as a single member, the number of assembling steps can be reduced.

Fourth Exemplary Embodiment

In the light emitters 4 and 4-1 to 4-3 to which the first exemplary embodiment is applied, the light emitter 4A to which the second exemplary embodiment is applied, and the light emitters 4B and 4B-1 to which the third exemplary embodiment is applied, the wall portion, that is, the support section, is not provided between the light source 20 and the driving section 50. The light emitter 4C to which the fourth exemplary embodiment is applied includes a support section 60C provided with a wall portion 68 between the light source 20 and the driving section 50.

Figure 13A:
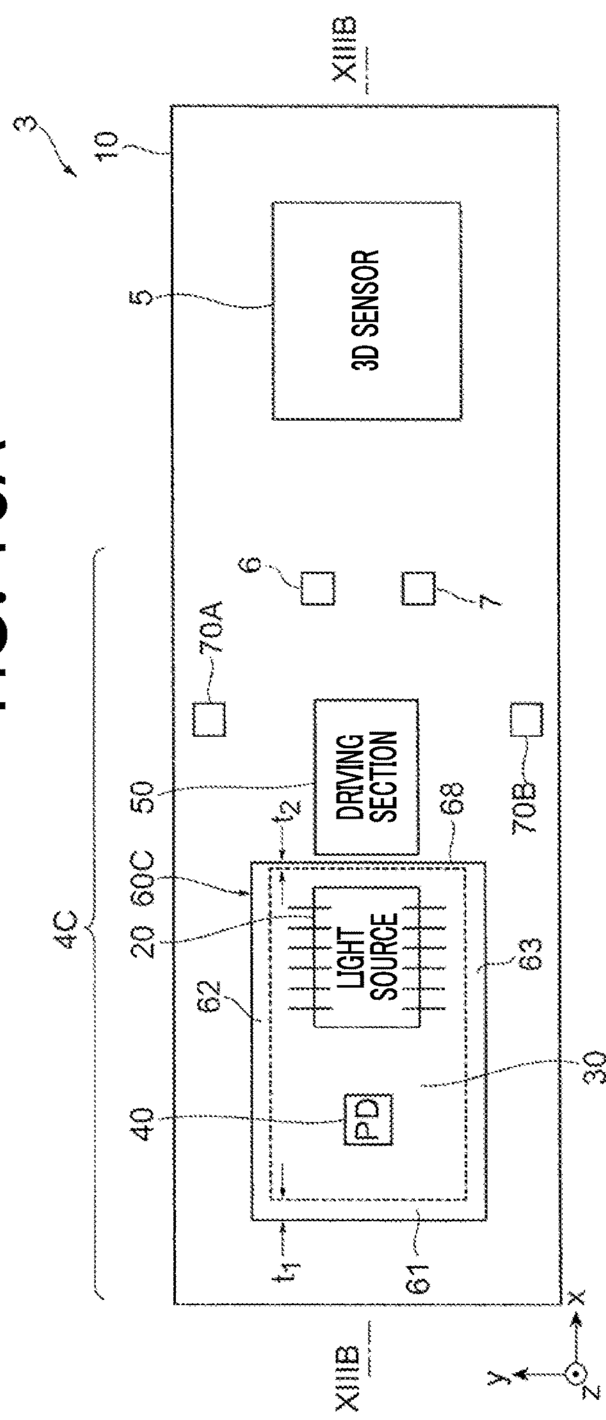
FIGS. 13A and 13B are views for illustrating a light emitter to which a fourth exemplary embodiment is applied.
Figure 13B:
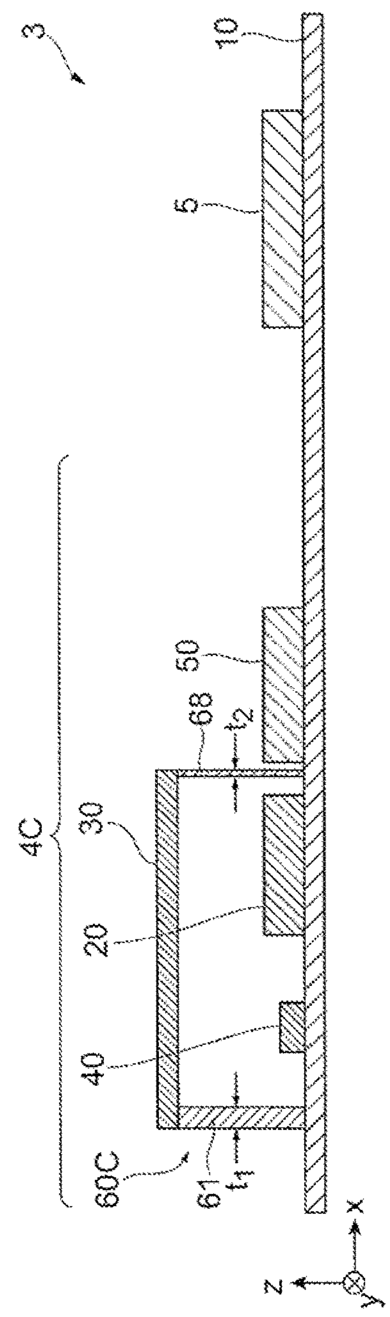

FIGS. 13A and 13B are views for illustrating the light emitter 4C to which the fourth exemplary embodiment is applied. FIG. 13A is a plan view, and FIG. 13B is a sectional view taken along line XIIIB-XIIIB of FIG. 13A. The same parts as the light emitter 4 illustrated in FIGS. 7A and 7B will be given the same reference numerals, and the description thereof will be omitted.

The support section 60C of the light emitter 4C includes the wall portions 61, 62, and 63 provided on the three sides of the diffusion plate 30, and the wall portion 68 on the one remaining side. In addition, the wall portions 61, 62, and 63 and the wall portion 68 are different from each other in thickness. Specifically, the thickness t2 of the wall portion 68 is smaller than the thickness t1 of the wall portions 61, 62, and 63 (t1>t2). The thick wall portions 61, 62, and 63 and a thin wall portion 68 support the diffusion plate 30. In addition, the thickness of the wall portion 68 may be set so as to reduce any influence on the inductance of the wiring that connects the light source 20 and the driving section 50 to each other. When the wall portion 68 is provided, the light from the light source 20 is prevented from going outside without passing through the diffusion plate 30. Further, since the light source 20 is surrounded by the support section 60C and the diffusion plate 30, the entry of foreign matter, such as dust or dirt, to the surrounding of the light source 20 is prevented.

The support section 60C became a single member to which the wall portions 61, 62, 63, and 68 are continuous to each other by the integral molding. Accordingly, as compared with a case of assembling plural support members, the number of assembling steps is reduced.

Fifth Exemplary Embodiment

A sectional structure of the information processing apparatus 1 that uses the light emitters 4 and 4-1 to 4-3 to which the first exemplary embodiment is applied, the light emitter 4A to which the second exemplary embodiment is applied, the light emitters 4B and 4B-1 to which the third exemplary embodiment is applied, and the light emitter 4C to which the fourth exemplary embodiment is applied, will be described. In addition, the information processing apparatus 1 is an example of a light emitting device.

Sectional Structure of Information Processing Apparatus 1

Here, the sectional structure of the information processing apparatus 1 will be described while the information processing apparatus 1 uses the light emitter 4 to which the first exemplary embodiment is applied. In addition, the same will also be applied to a case of using other light emitters.

Figure 14:
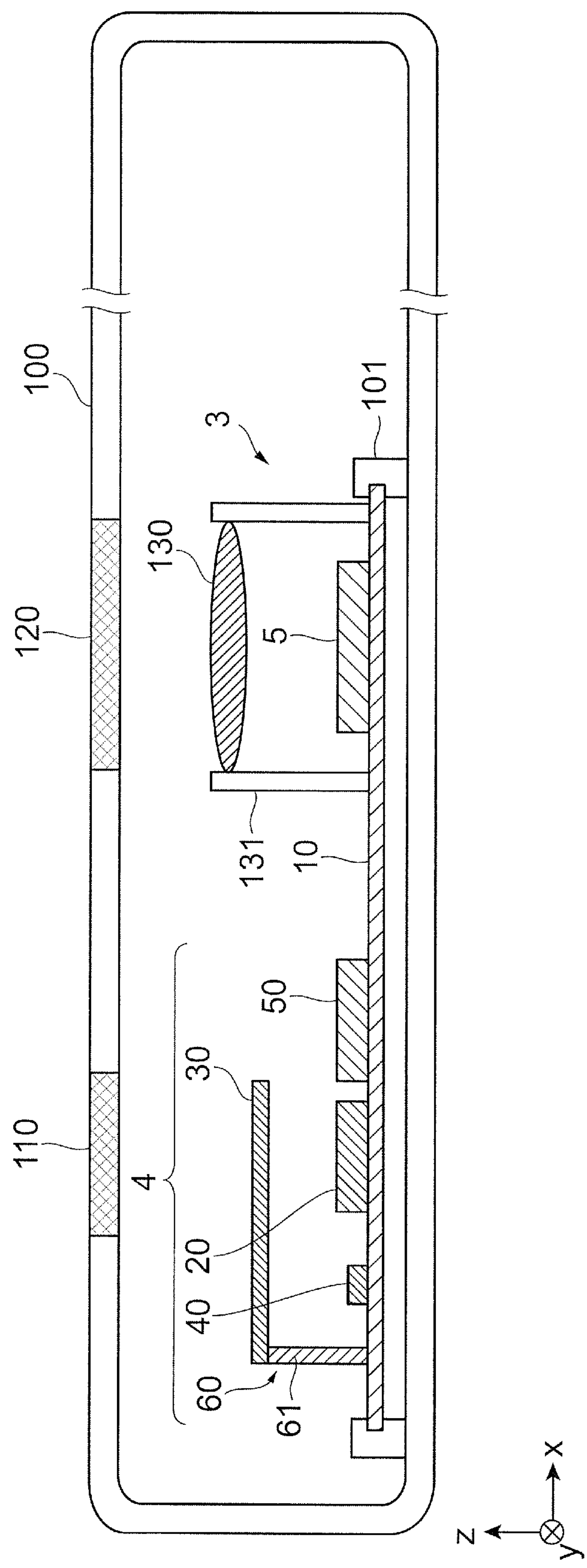
FIG. 14 is a view for illustrating a sectional structure of an information processing apparatus that uses the light emitter.

FIG. 14 is a view for illustrating the sectional structure of the information processing apparatus 1 that uses the light emitter 4. The information processing apparatus 1 includes the optical device 3 and a housing 100. As described above, the optical device 3 includes the light emitter 4 and the 3D sensor 5. In other words, the housing 100 accommodates the light emitter 4. Here, similar to the light emitter 4 illustrated in FIGS. 7A and 7B, the 3D sensor 5 is mounted on the substrate 10 provided in the light emitter 4.

The housing 100 includes a transmission section plate 110 through which the light emitted from the light source 20 in the light emitter 4 is transmitted, and a transmission section plate 120 through which the light received by the 3D sensor 5 is transmitted. The transmission section plate 110 is provided at a part that corresponds to a region where the light source 20 emits the light, and the transmission section plate 120 is provided at a part that corresponds to a region where the 3D sensor 5 receives the light. The housing 100 includes, for example, a metal material, such as aluminum or magnesium, or a resin material. In addition, the transmission section plates 110 and 120 each include a transparent material, such as glass or acrylic.

The substrate 10 is held by substrate holding means 101 for holding the substrate 10 with respect to the housing 100. In addition, on the 3D sensor 5, a lens 130 for converging the light transmitted through the transmission section plate 120 to the 3D sensor 5, is provided. The lens 130 is held by lens holding means 131 for holding the lens 130 with respect to the substrate 10. The substrate holder 101 is, for example, a fastener, such as a screw, or a fitting member, which is made of resin or the like.

In the information processing apparatus 1, the distance between the light source 20 and the driving section 50 of the light emitter 4 is set to be smaller than the distance between the light source 20 and the transmission section plate 110.

In addition, the transmission section plate 120 may have a function of the lens 130.

After being transmitted through the diffusion plate 30, the light emitted from the light source 20 of the light emitter 4 is transmitted through the transmission section plate 110 and is applied to the measurement target.

When the light emitter 4 (optical device 3) is accommodated in the housing 100 in this manner, the diffusion plate 30 is prevented from being damaged. In other words, application of high-intensity light directly to the outside due to damage to the diffusion plate 30 is prevented.

In the above-described first to fifth exemplary embodiments, the diffusion plate 30 of which the spread angle of the light emitted by the light emitting element increases are described as an example of the cover section. Instead of the diffusion plate 30, the cover section may be a member through which the light is transmitted, for example, a transparent base material, such as a cover for protection, an optical member, such as a converging lens and a microlens array having a converging action to reduce the spread angle in the opposite, or the like. Here, the cover section including the members is adopted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light emitter comprising:

a substrate with a surface;

a driving circuit on the surface;

a light source on the surface and driven by the driving circuit;

a cover through which light emitted from the light source is transmitted and that is in an optical axial direction of the light source; and a support that is on a part of the surface excluding a part between the driving circuit and the light source and supports the cover.

2. The light emitter according to claim 1, wherein the light source includes a plurality of light emitting elements, the cover is a diffusion plate that diffuses and transmits light emitted from the light emitting elements, and an end portion of the cover on a side on which the support for the cover is not provided is configured to transmit light with an emission intensity of 50% or higher from the light emitting element at an end portion of the light emitting element on the side on which the support is not provided.

3. The light emitter according to claim 2, wherein the end portion of the cover on the side on which the support for the cover is not provided is configured to transmit light with an emission intensity of 0.1% or higher from the light emitting element at the end portion on the side on which the support is not provided.

4. The light emitter according to claim 1, wherein the cover covers at least a part of a surface of the driving circuit.

5. The light emitter according to claim 4, wherein the substrate includes a circuit on the substrate that is not covered with the cover in addition to the driving circuit.

6. The light emitter according to claim 1, wherein the support is a wall surrounding the light source and the driving circuit.

7. The light emitter according to claim 6, further comprising:

second cover that extends from the wall of the support on the driving circuit side toward the light source side and is configured to block the transmission of the light.

8. The light emitter according to claim 7, wherein the second cover and the support are formed as a single member.

9. The light emitter according to claim 1, further comprising:

a beam on an end portion side of the cover on the driving circuit side that extends from the cover side toward the driving circuit side.

10. The light emitter according to claim 9, wherein the beam is in contact with a surface of the driving circuit.

11. The light emitter according to claim 9, wherein the beam includes a member that blocks the transmission of the light from the light source.

12. The light emitter according to claim 9, wherein the beam and the support are formed as a single member.

13. The light emitter according to claim 1, wherein the support is formed as a single member.

14. A light emitting device comprising:

the light emitter according to claim 1; and a housing that accommodates the light emitter, wherein the cover is a diffusion plate, and the housing includes a transmission plate that transmits light generated by diffusing light from the light source in the light emitter with the diffusion plate.

15. The light emitting device according to claim 14, wherein a distance between the light source and the driving circuit in the light emitter is smaller than a distance between the light source and the transmission plate.

16. An optical device comprising:

the light emitter according to claim 1; and a light receiving sensor that receives light that is emitted from the light source in the light emitter and reflected by a measurement target, wherein the light receiving sensor outputs a signal that corresponds to time from emission of the light from the light source to reception of the light by the light receiving sensor.

17. An information processing apparatus comprising:

the optical device according to the claim 16; and a controller that specifies a three-dimensional shape of the measurement target based on light emitted from the light source in the optical device, reflected by the measurement target, and received by the light receiving sensor in the optical device.

18. The information processing apparatus according to claim 17, wherein the controller performs authentication processing for use of the apparatus based on a result of specifying the three-dimensional shape.

19. A light emitter comprising:

a substrate with a surface;

a driving circuit on the surface;

a light source that is on the surface and is driven by the driving circuit;

a cover through which light emitted from the light source is transmitted and that is in an optical axial direction of the light source; and a support that is on the surface, has a part that is between the driving circuit and the light source in a direction parallel to the surface and thinner than other parts, and supports the cover.

* * * * *